US012117762B2

(12) United States Patent
Uoo et al.

(10) Patent No.: US 12,117,762 B2
(45) Date of Patent: Oct. 15, 2024

(54) ATTACHMENT AND IMAGE FORMING SYSTEM

(71) Applicant: CANON KABUSHIKI KAISHA, Tokyo (JP)

(72) Inventors: Yukino Uoo, Shizuoka (JP); Yasuhiro Fukase, Kanagawa (JP); Shinichi Nishida, Kanagawa (JP); Hiroyuki Munetsugu, Kanagawa (JP); Goshi Ozaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/228,032

(22) Filed: Jul. 31, 2023

(65) Prior Publication Data

US 2024/0045367 A1 Feb. 8, 2024

(30) Foreign Application Priority Data

Aug. 5, 2022 (JP) ................................. 2022-125412

(51) Int. Cl.
*G03G 15/08* (2006.01)
*G03G 21/16* (2006.01)

(52) U.S. Cl.
CPC ..... *G03G 21/1647* (2013.01); *G03G 15/0865* (2013.01); *G03G 21/1676* (2013.01)

(58) Field of Classification Search
CPC ........... G03G 15/0865; G03G 15/0867; G03G 15/0886; G03G 21/1647; G03G 2215/066; G03G 2215/067; G03G 2215/0673
See application file for complete search history.

(56) References Cited

U.S. PATENT DOCUMENTS

| | | | |
|---|---|---|---|
| 7,865,115 | B2 | 1/2011 | Oguma et al. |
| 8,160,478 | B2 | 4/2012 | Munetsugu et al. |
| 8,165,493 | B2 | 4/2012 | Chadani et al. |
| 8,559,849 | B2 | 10/2013 | Suzuki et al. |
| 9,213,306 | B2 | 12/2015 | Morioka et al. |
| 9,377,714 | B2 | 6/2016 | Nakazawa et al. |
| 10,386,786 | B2 | 8/2019 | Sato et al. |

(Continued)

FOREIGN PATENT DOCUMENTS

| | | |
|---|---|---|
| JP | 2006-154615 A | 6/2006 |
| JP | 2013-050491 A | 3/2013 |

(Continued)

OTHER PUBLICATIONS

Co-pending U.S. Appl. No. 18/237,469, filed Aug. 24, 2023.

(Continued)

*Primary Examiner* — Hoang X Ngo
(74) *Attorney, Agent, or Firm* — Venable LLP

(57) ABSTRACT

An attachment is used with an image forming apparatus. The image forming apparatus includes a main assembly including a photosensitive drum and a main assembly portion-to-be-engaged, and includes a developing unit including a developing container, a developing roller, and a mounting portion. The attachment includes a first engaging portion, and a second engaging portion. The attachment is mountable to the mounting portion in a state in which a toner container is not mounted to the mounting portion. The attachment does not include a toner accommodating portion for accommodating the toner.

20 Claims, 26 Drawing Sheets

(56) References Cited

U.S. PATENT DOCUMENTS

| | | | | |
|---|---|---|---|---|
| 10,459,402 | B2 | 10/2019 | Kashiide et al. | |
| 10,635,047 | B2 | 4/2020 | Kamoshida et al. | |
| 10,782,647 | B2 | 9/2020 | Kashiide et al. | |
| 11,067,950 | B2 | 7/2021 | Kashiide et al. | |
| 11,131,960 | B2 | 9/2021 | Sato et al. | |
| 11,307,529 | B2 | 4/2022 | Sato et al. | |
| 11,314,199 | B2 | 4/2022 | Sato et al. | |
| 11,353,822 | B2 | 6/2022 | Kashiide et al. | |
| 11,392,082 | B2 | 7/2022 | Nishida et al. | |
| 11,567,445 | B2 | 1/2023 | Munetsugu et al. | |
| 11,592,766 | B2 | 2/2023 | Ozaki et al. | |
| 11,662,673 | B2 | 5/2023 | Ozaki et al. | |
| 11,662,687 | B2 | 5/2023 | Kashiide et al. | |
| 11,693,355 | B2 | 7/2023 | Sato | |
| 11,693,356 | B2 | 7/2023 | Ozaki et al. | |
| 11,698,601 | B2 | 7/2023 | Masaaki et al. | |
| 11,846,897 | B2 * | 12/2023 | Matsumoto ........ | G03G 15/0863 |
| 11,860,556 | B2 * | 1/2024 | Uneme .............. | G03G 15/0865 |
| 2013/0051844 | A1 | 2/2013 | Shinoya et al. | |
| 2020/0301352 | A1 | 9/2020 | Matsumaru et al. | |
| 2021/0397122 | A1 | 12/2021 | Fukui et al. | |
| 2022/0050417 | A1 | 2/2022 | Nishida et al. | |
| 2022/0075312 | A1 | 3/2022 | Ozaki et al. | |
| 2022/0206412 | A1 | 6/2022 | Nogami et al. | |
| 2023/0031856 | A1 | 2/2023 | Munetsugu et al. | |
| 2023/0096202 | A1 | 3/2023 | Sato et al. | |
| 2023/0176496 | A1 | 6/2023 | Fujino et al. | |
| 2023/0176503 | A1 | 6/2023 | Fukui et al. | |
| 2023/0185234 | A1 | 6/2023 | Kashiide et al. | |
| 2023/0205114 | A1 | 6/2023 | Ozaki et al. | |
| 2023/0205128 | A1 | 6/2023 | Sugimoto et al. | |
| 2023/0205129 | A1 | 6/2023 | Suetsugu et al. | |
| 2023/0229108 | A1 | 7/2023 | Matsumaru et al. | |
| 2023/0244157 | A1 | 8/2023 | Kubo et al. | |
| 2023/0266695 | A1 | 8/2023 | Munetsugu et al. | |
| 2023/0297024 | A1 | 9/2023 | Sato et al. | |
| 2023/0297025 | A1 | 9/2023 | Ozaki et al. | |
| 2023/0324829 | A1 | 10/2023 | Munetsugu et al. | |

FOREIGN PATENT DOCUMENTS

| | | | |
|---|---|---|---|
| JP | 2020-154301 | A | 9/2020 |
| JP | 2022-103670 | A | 7/2022 |

OTHER PUBLICATIONS

Co-pending U.S. Appl. No. 18/241,266, filed Sep. 1, 2023.
Co-pending U.S. Appl. No. 18/372,781, filed Sep. 26, 2023.
Co-pending U.S. Appl. No. 18/376,899, filed Oct. 5, 2023.
Co-pending U.S. Appl. No. 18/377,859, filed Oct. 9, 2023.

* cited by examiner (a)

(b)

(a)

(b)

(a)

(b)

ATTACHMENT AND IMAGE FORMING SYSTEM

FIELD OF THE INVENTION AND RELATED ART

The present invention relates to an attachment attached to an image forming apparatus for forming an image on a recording material.

A constitution in which toner is supplied from a toner container, mounted to a mounting portion, to a developing container provided in an image forming apparatus of an electrophotographic type is disclosed (Japanese Laid-Open Patent Application No. 2020-154301).

A simple constitution capable of suppressing vibration of a developing unit provided with the mounting portion for mounting the toner container has been required during transportation of an image forming apparatus including the developing unit.

SUMMARY OF THE INVENTION

According to an aspect of the present invention, there is provided an attachment for use with an image forming apparatus which includes a main assembly including a photosensitive drum and a main assembly portion-to-be-engaged, and which includes a developing unit including a developing container, a developing roller carrying toner accommodated in the developing container, and a mounting portion to which a toner container accommodating the toner is mountable and which is constituted so as to communicate with an inside of the developing container and so as to be exposed to an outside of the main assembly, the developing unit being constituted so as to be movable relative to the main assembly, the attachment comprising: a first engaging portion configured to engage with the mounting portion; and a second engaging portion configured to engage with the main assembly portion-to-be-engaged, wherein the attachment is mountable to the mounting portion in a state in which the toner container is not mounted to the mounting portion, and wherein the attachment does not include a toner accommodating portion for accommodating the toner.

Further features of the present invention will become apparent from the following description of exemplary embodiments with reference to the attached drawings.

Figure 4:
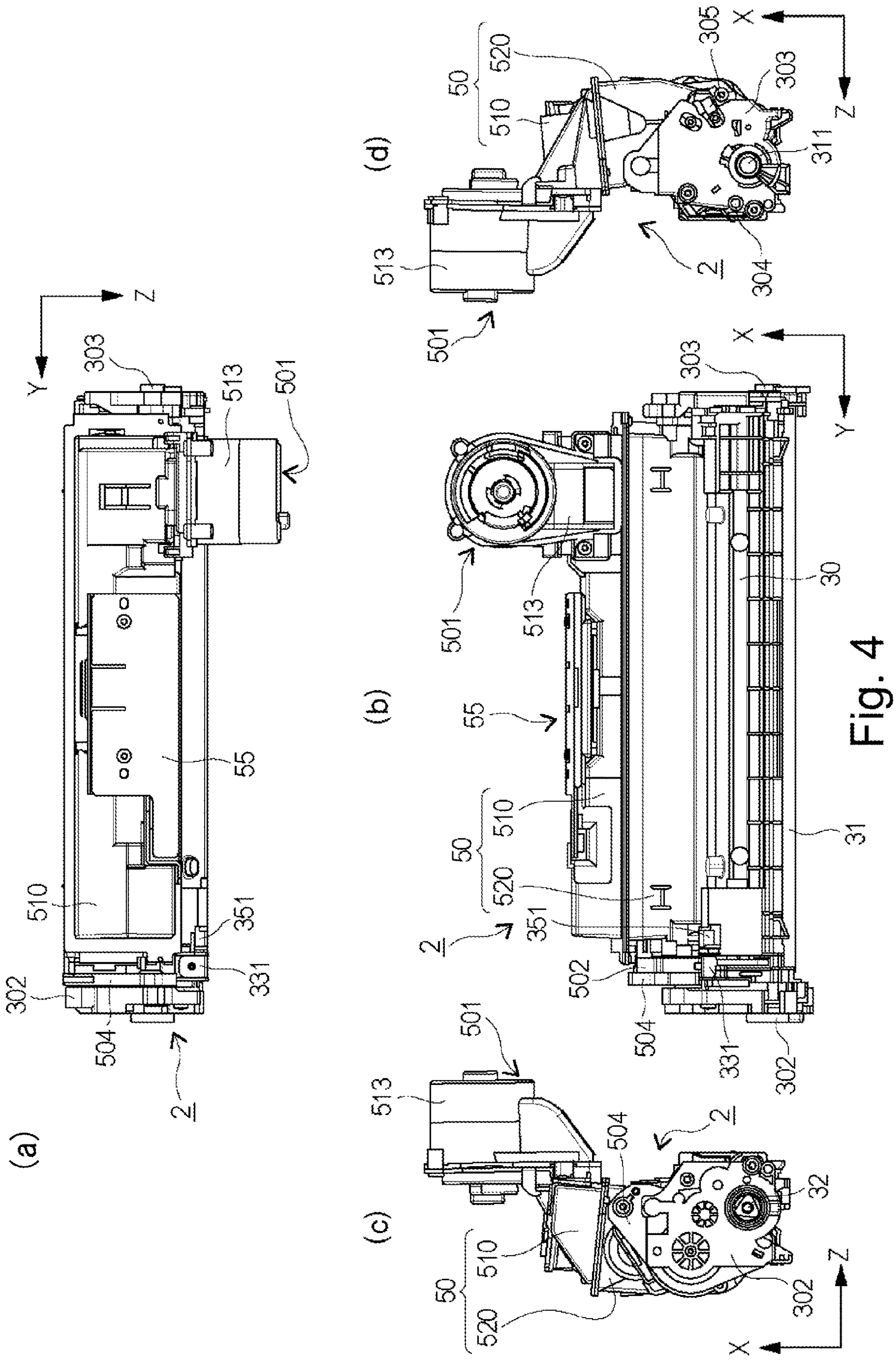

Parts (a) to (d) of FIG. 4 are schematic views of a process unit in the embodiment 1, in which part (a) is a front view, part (b) is a top (plan) view, and parts (c) and (d) are left and right side views, respectively.

Figure 5:
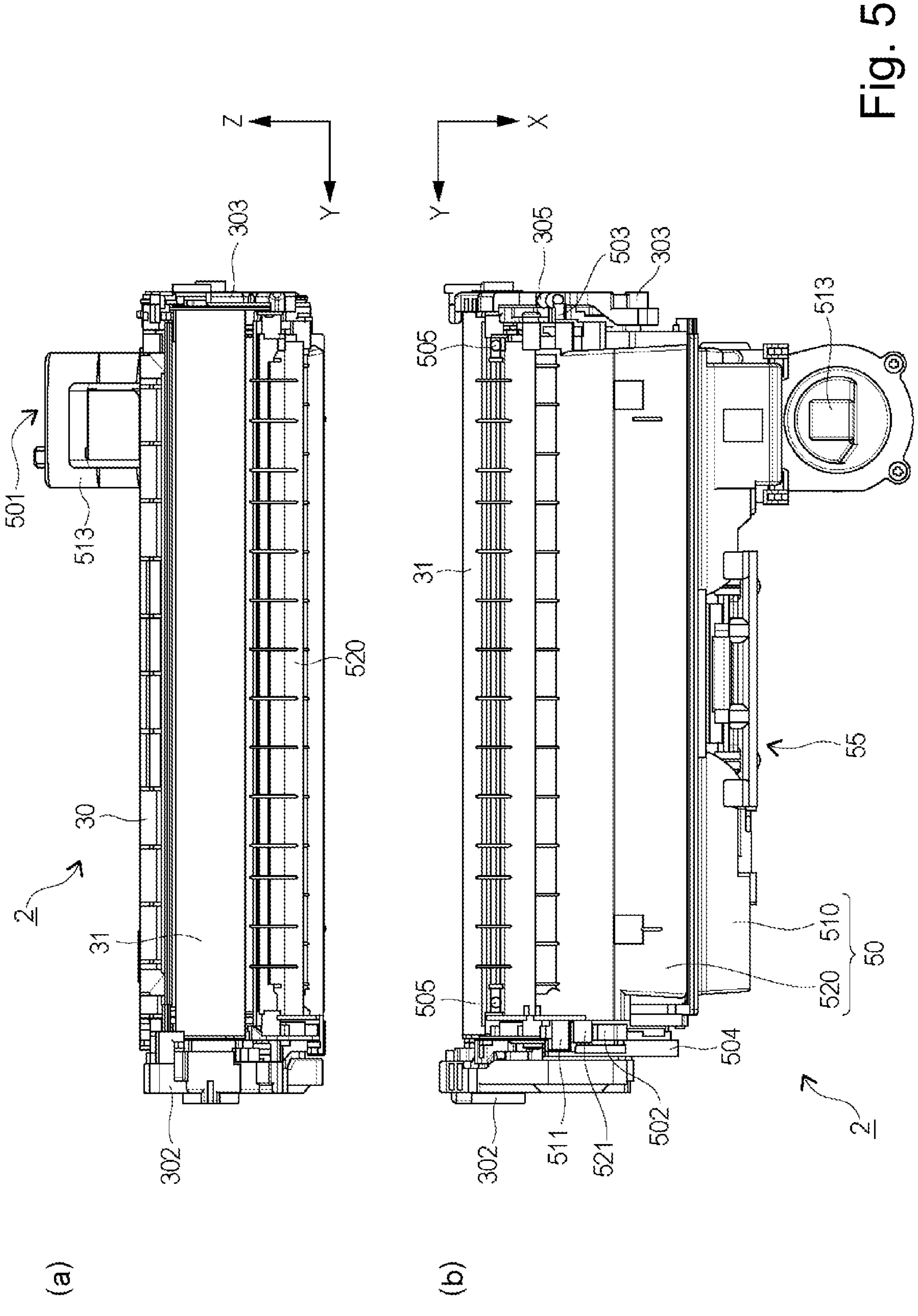

Parts (a) and (b) of FIG. 5 are schematic views of the process unit in the embodiment 1, in which part (a) is a rear view and part (b) is a bottom view.

Figure 6:
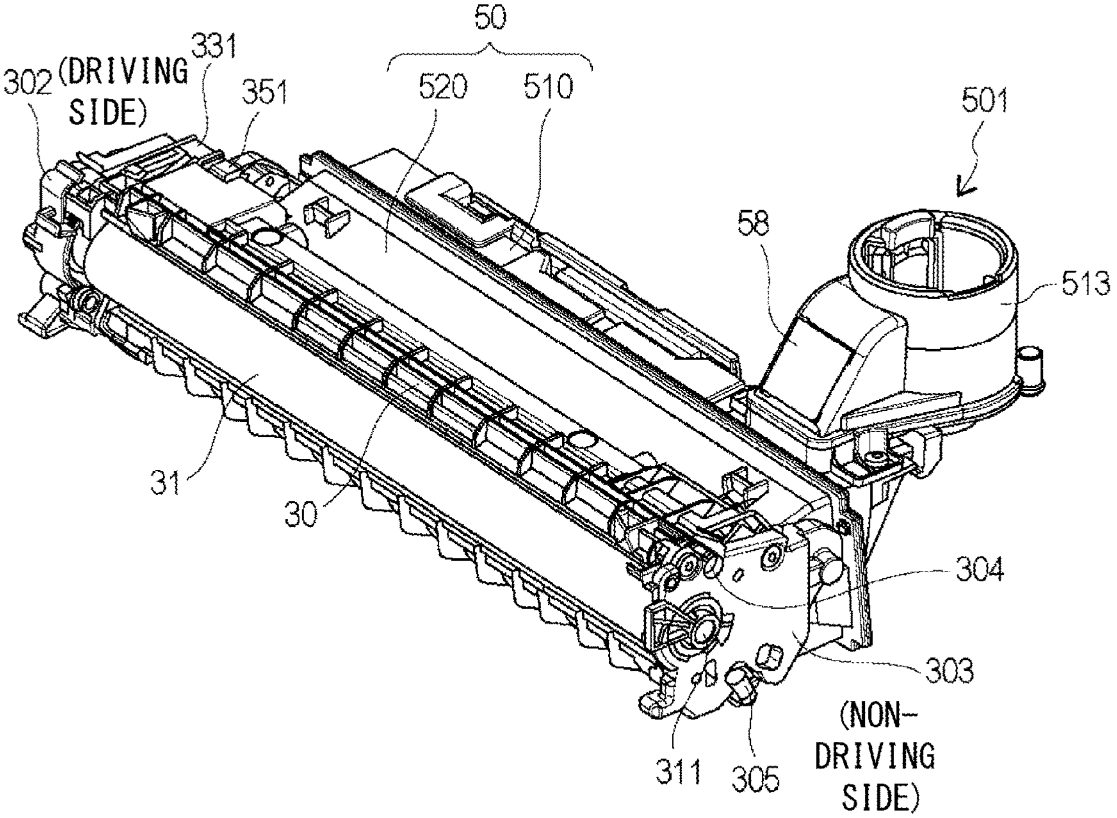
Figure 6:
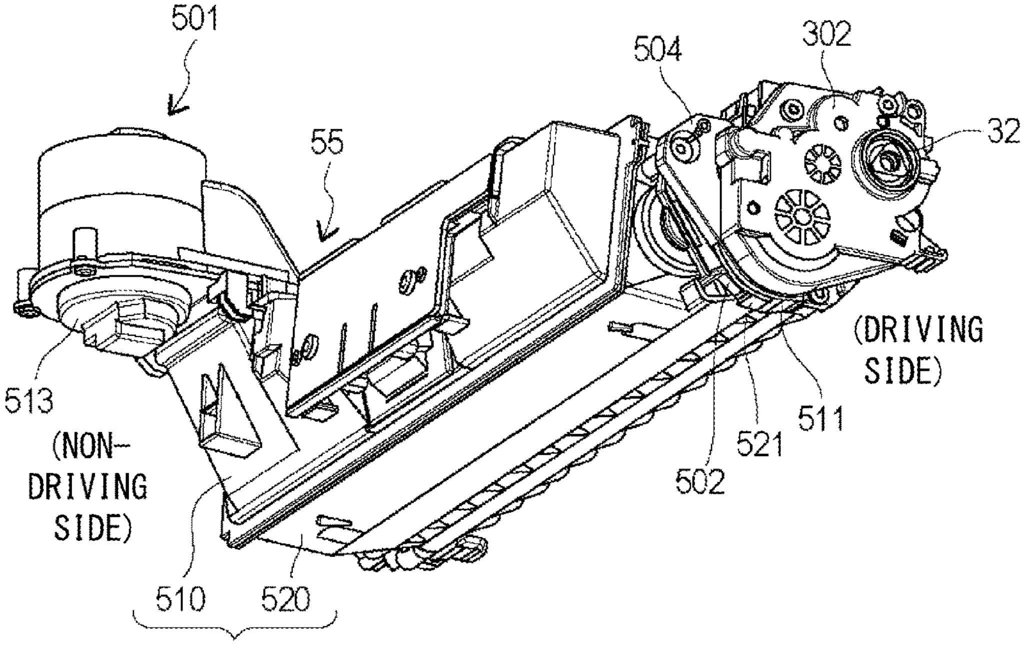

Parts (a) and (b) of FIG. 6 are perspective views of the process unit in the embodiment 1, in which part (a) is the perspective view as viewed from an upper-left rear side, and part (b) is the perspective view as viewed from a lower-right front side.

Figure 7:
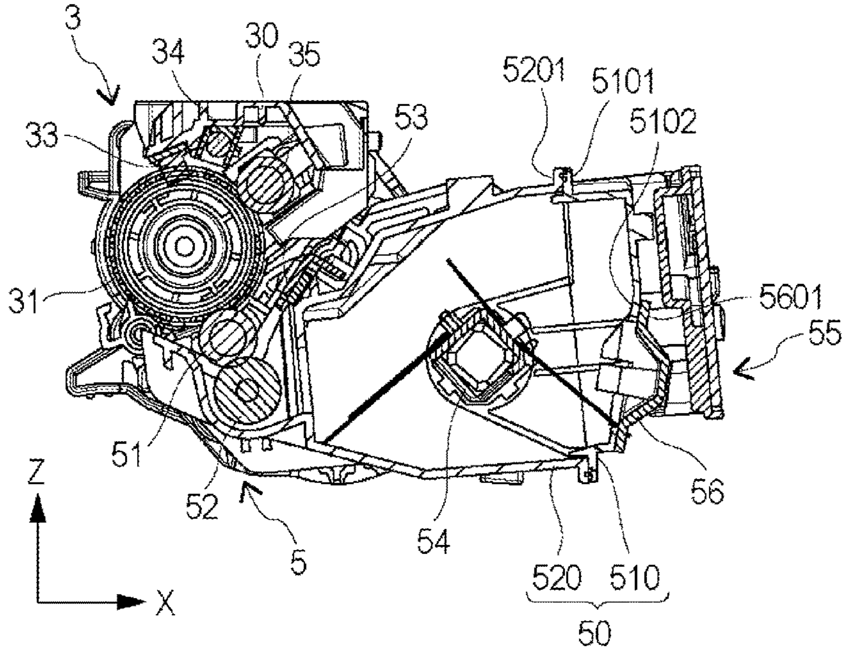
Figure 7:
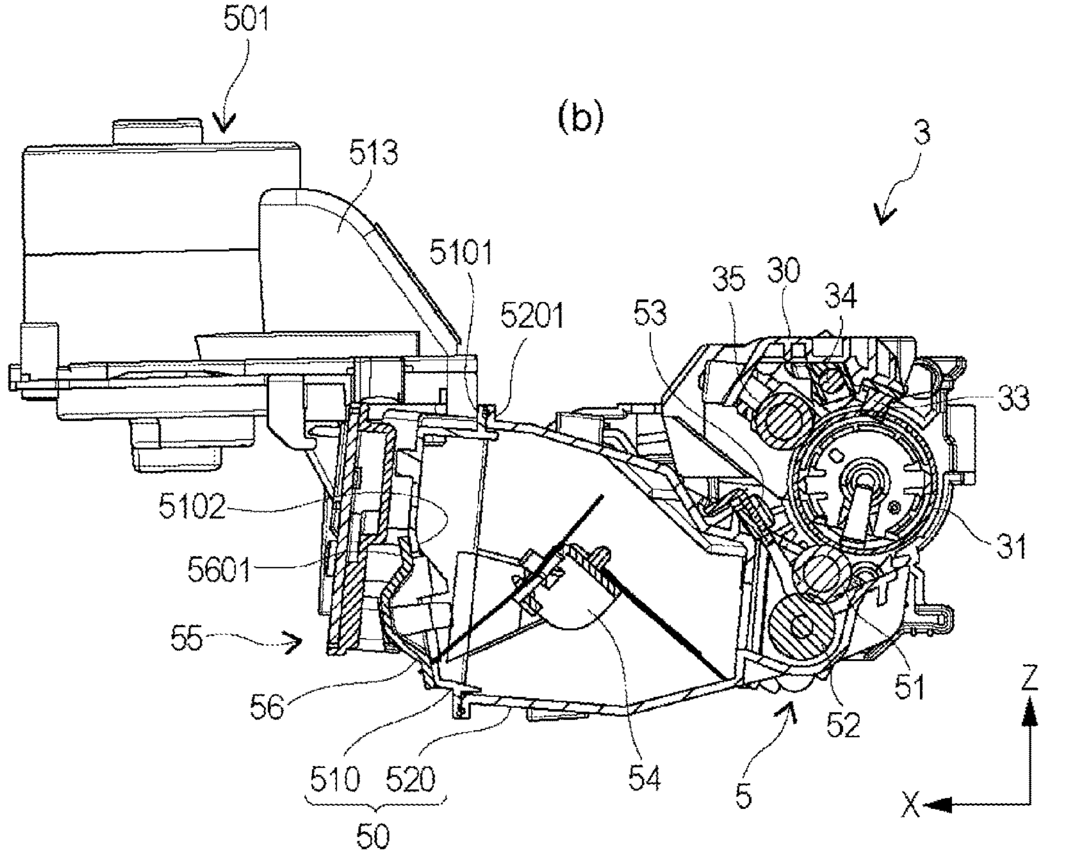

Parts (a) and (b) of FIG. 7 are sectional views of the process unit in the embodiment 1.

Figure 8:
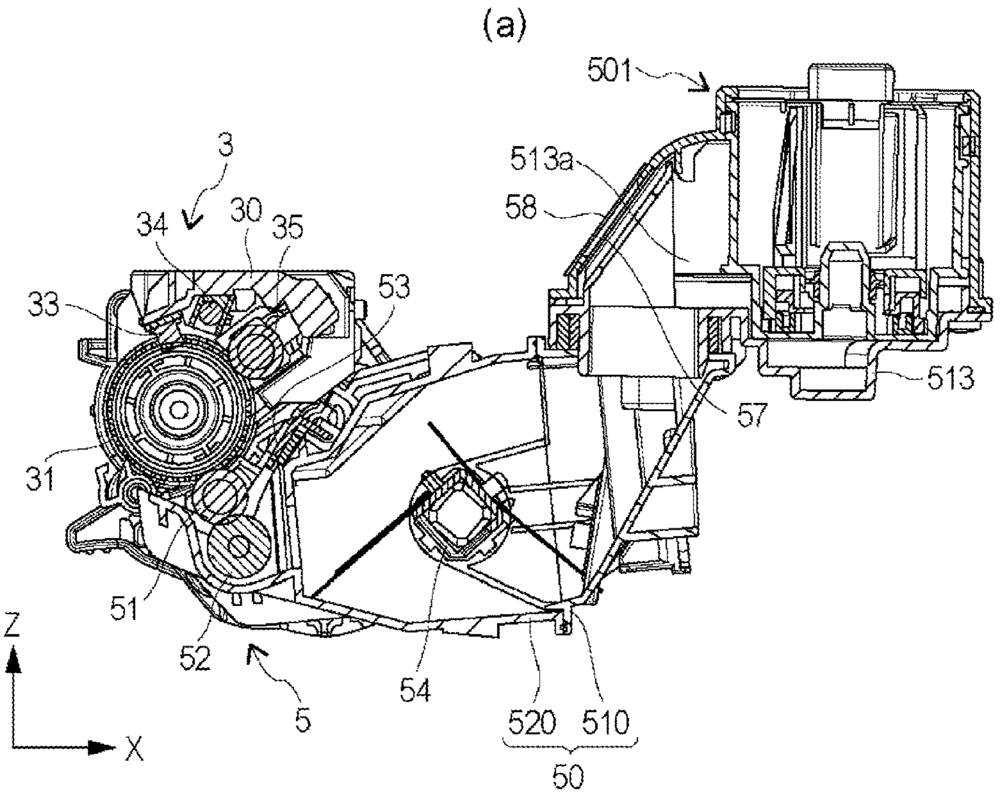
Figure 8:
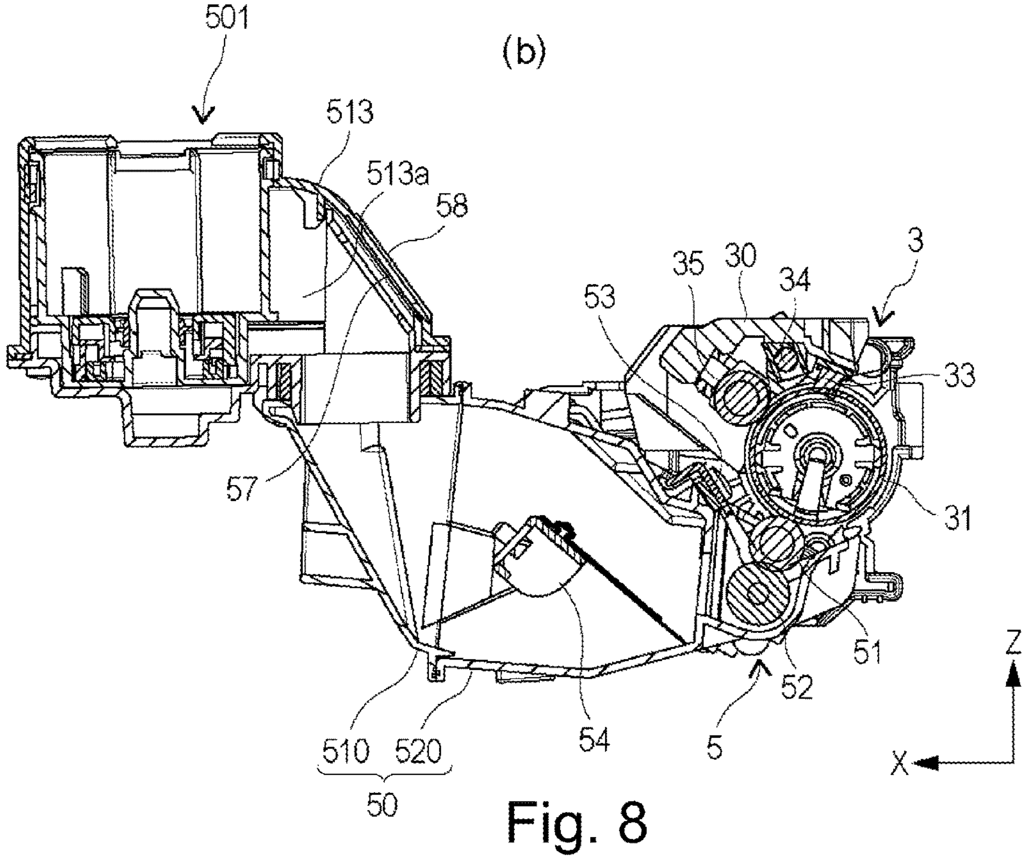

Parts (a) and (b) of FIG. 8 are sectional views of the process unit in the embodiment 1.

Figure 9:
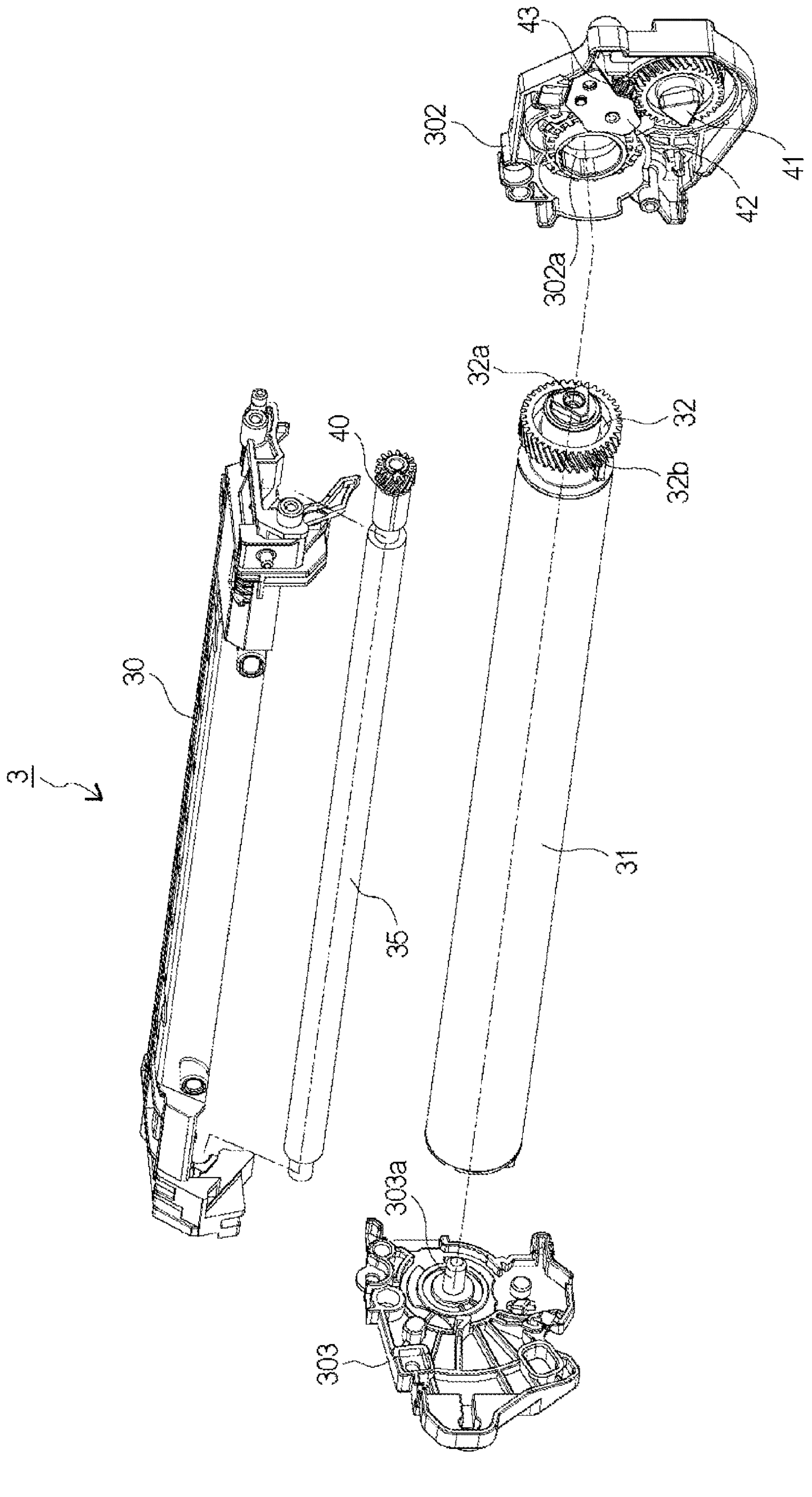

FIG. 9 is an exploded perspective view of a drum unit in the embodiment 1.

Figure 10:
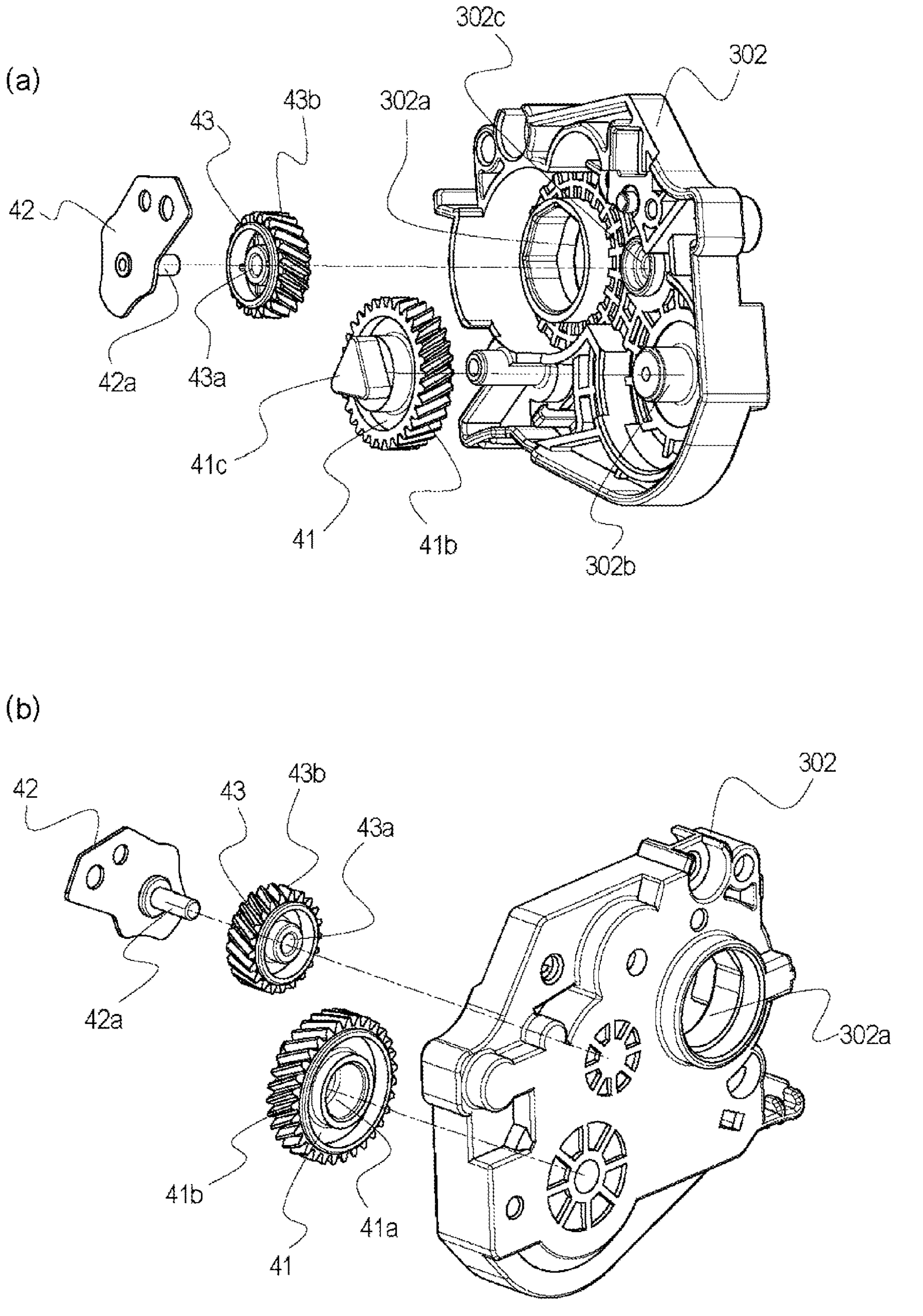

Parts (a) and (b) of FIG. 10 are exploded perspective views each showing a bearing member and gears of the drum unit in the embodiment 1.

Figure 11:
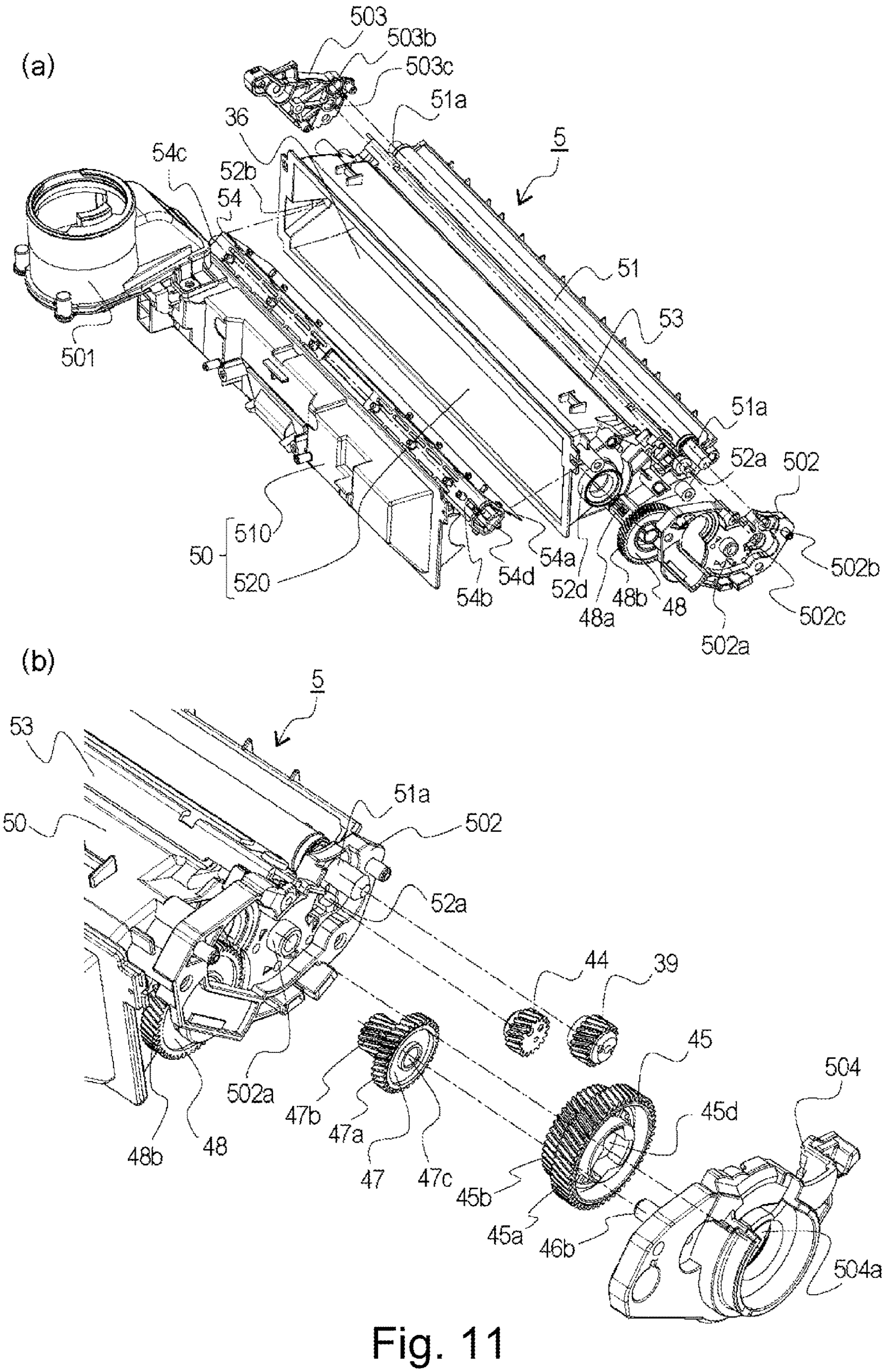

Parts (a) and (b) of FIG. 11 are exploded perspective views each showing a developing unit in the embodiment 1.

Figure 12:
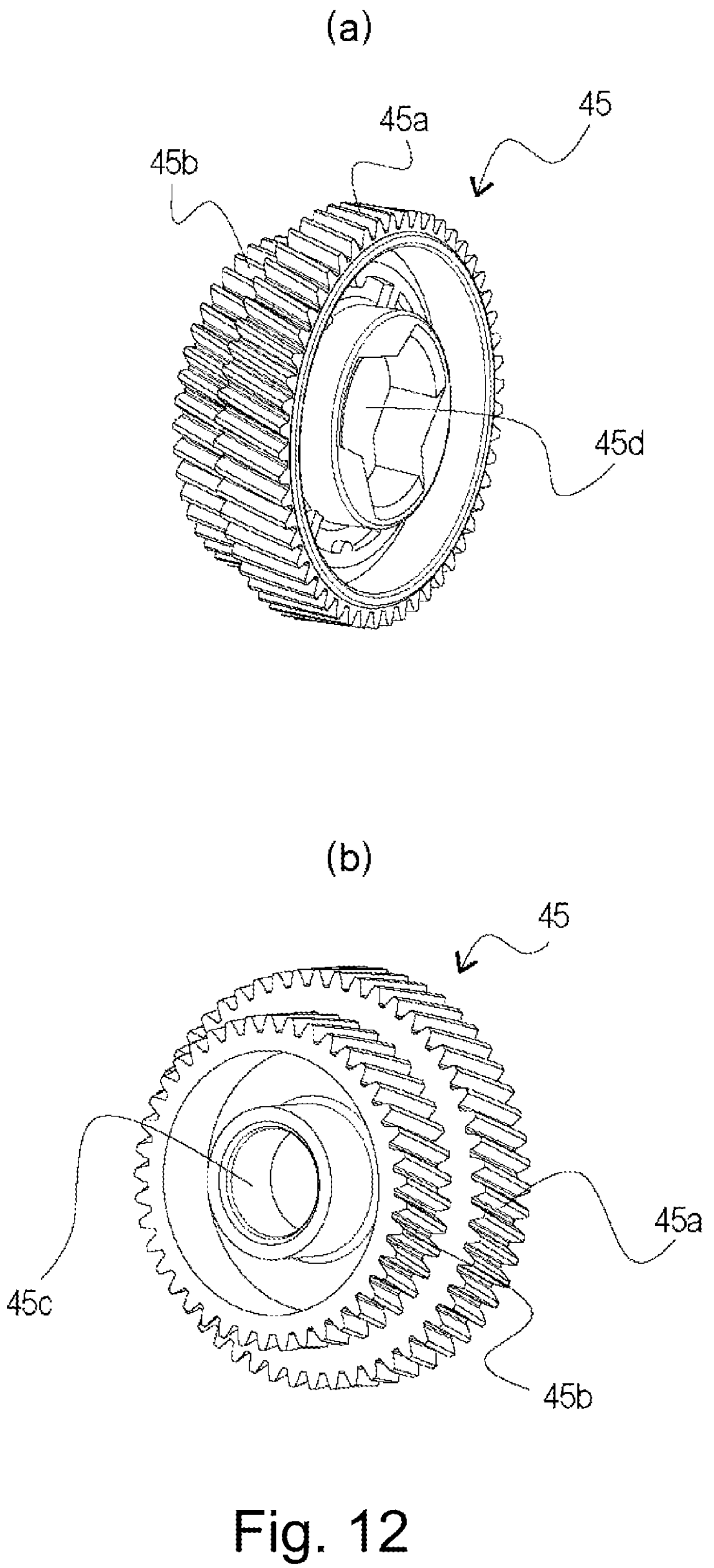

Parts (a) and (b) of FIG. 12 are perspective views each showing a developing (member) driving member in the embodiment 1.

Figure 13:
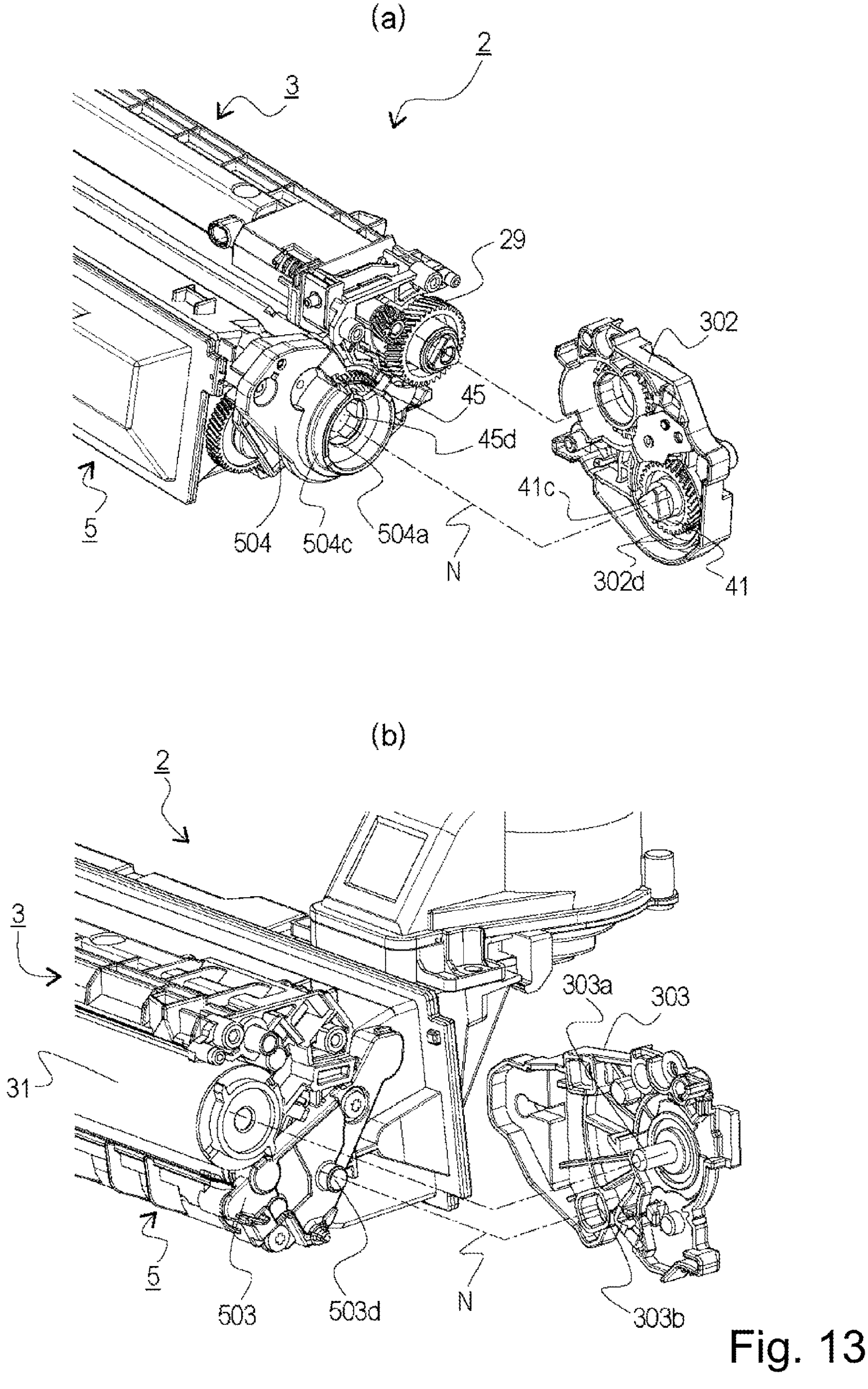

Parts (a) and (b) of FIG. 13 are exploded perspective views each showing a longitudinal end portion of the process unit in the embodiment 1.

Figure 14:
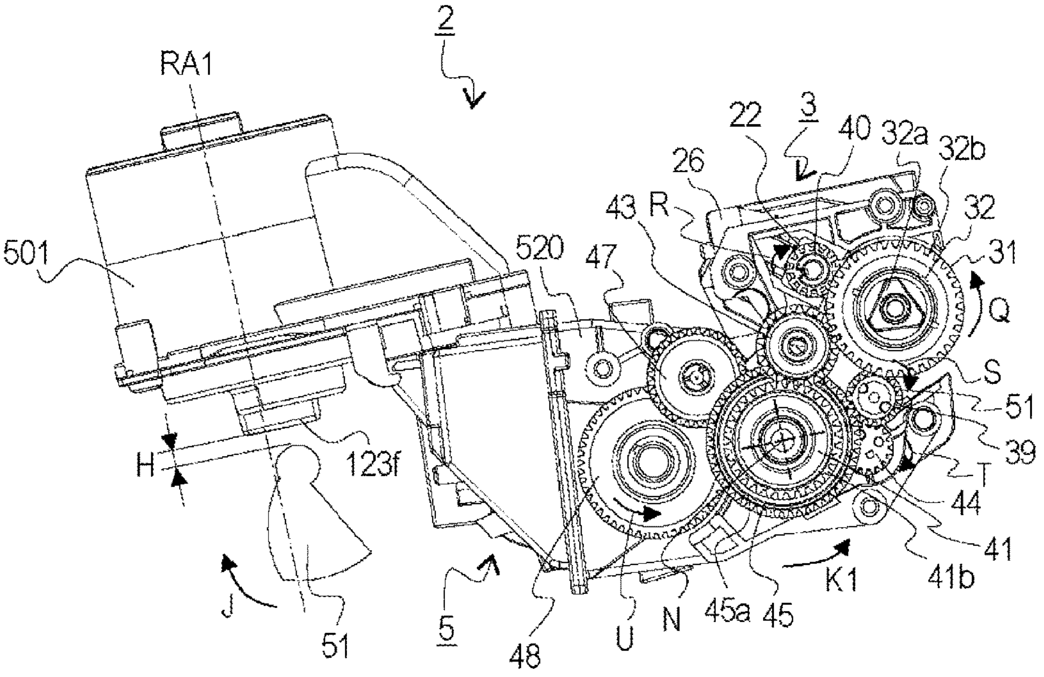
Figure 14:
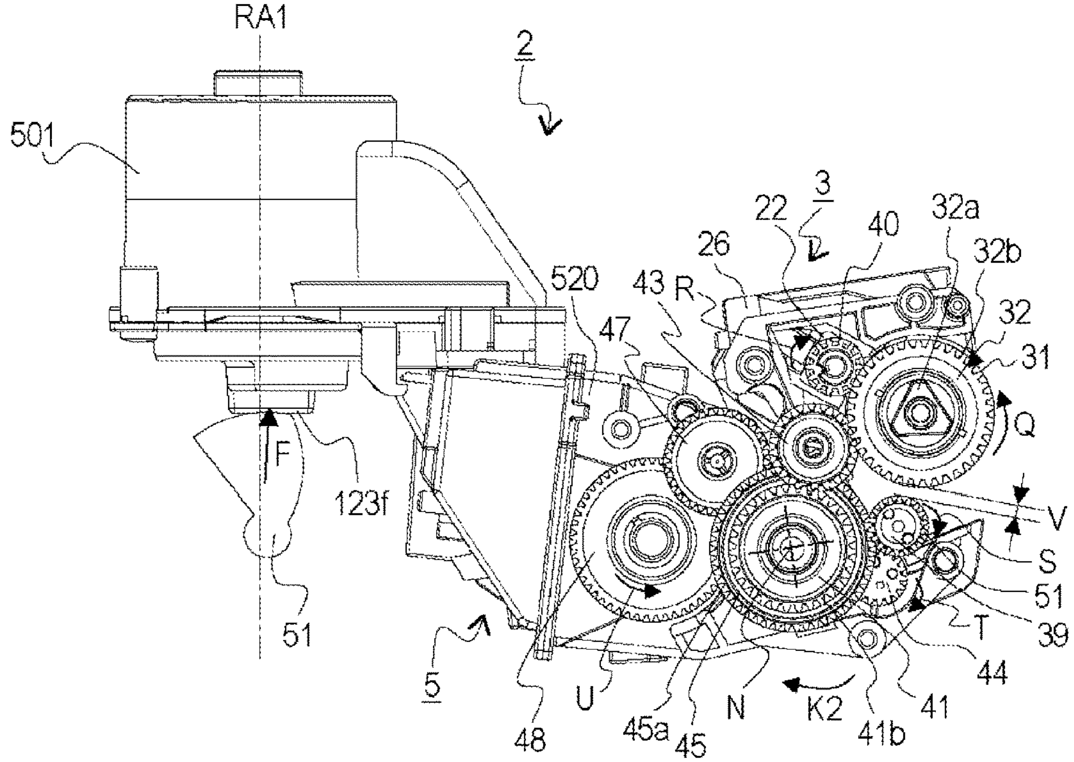

Parts (a) and (b) of FIG. 14 are schematic views each showing a state of the developing unit and the drum unit, in which part (a) is the state in which the developing unit is moved to a contact position to the drum unit, and part (b) is the state in which the developing unit is moved to a separated position from the drum unit.

Figure 15:
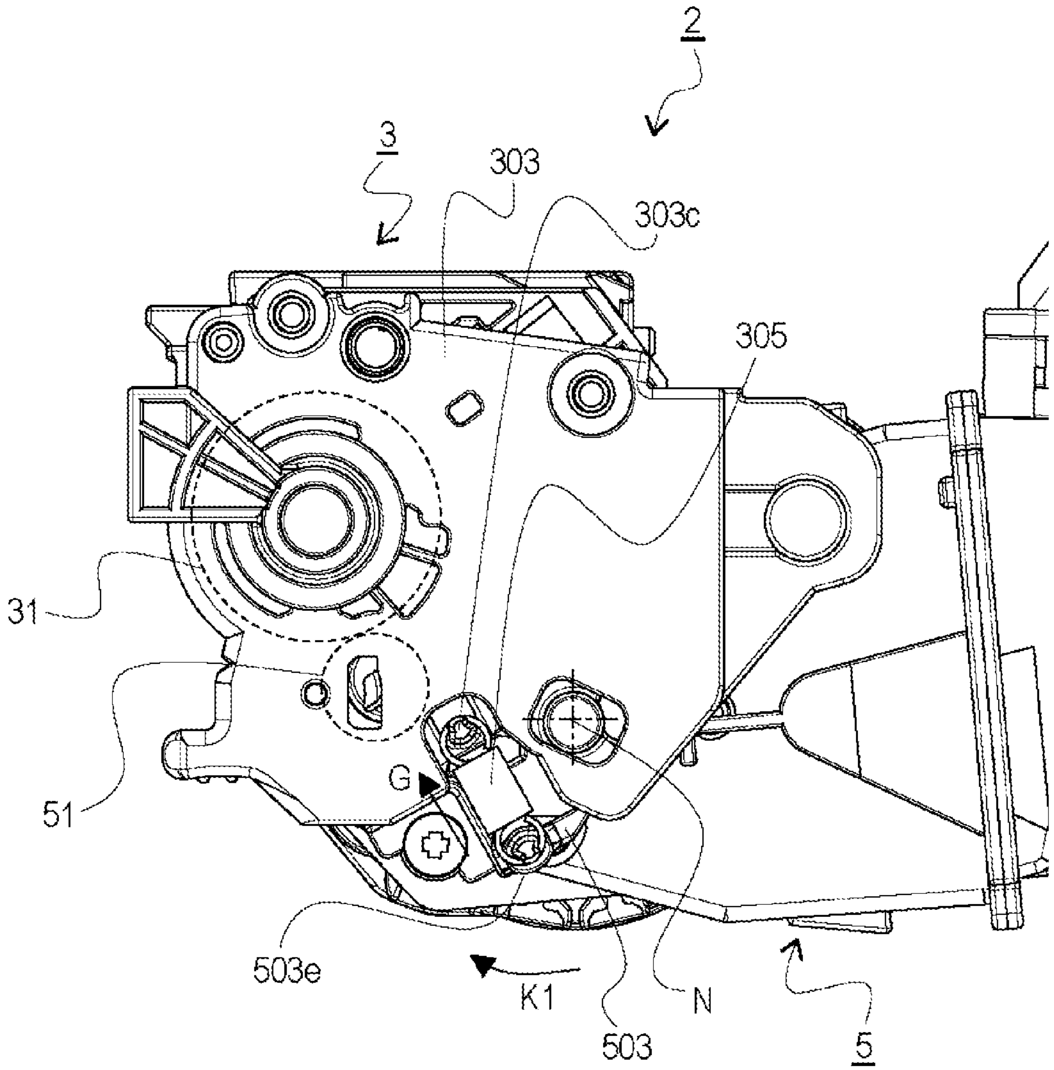

FIG. 15 is an enlarged view of a side surface of the process unit in the embodiment 1.

Figure 16:
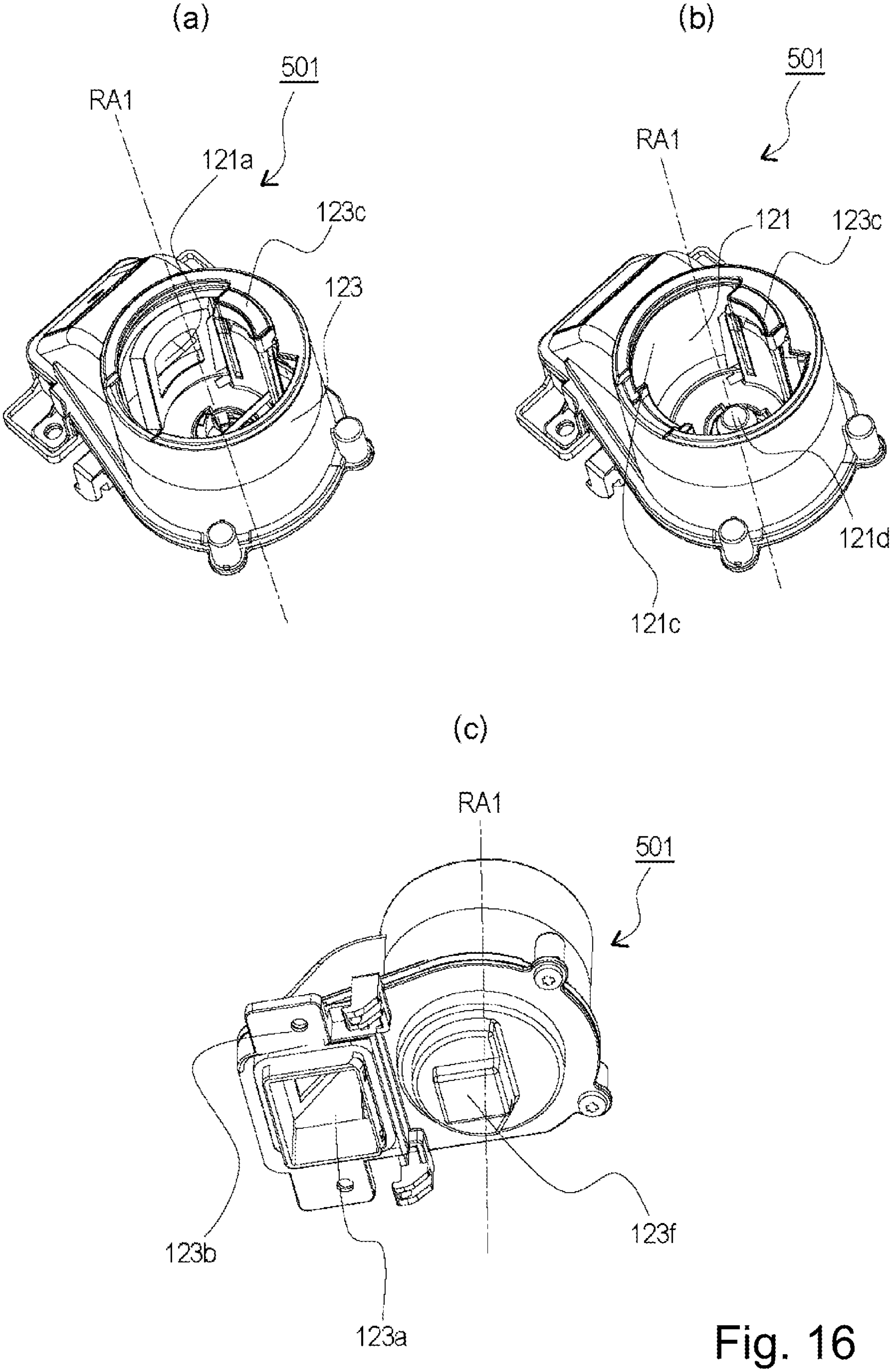

Parts (a) to (c) of FIG. 16 are perspective views each showing a mounting portion in the embodiment 1.

Figure 17:
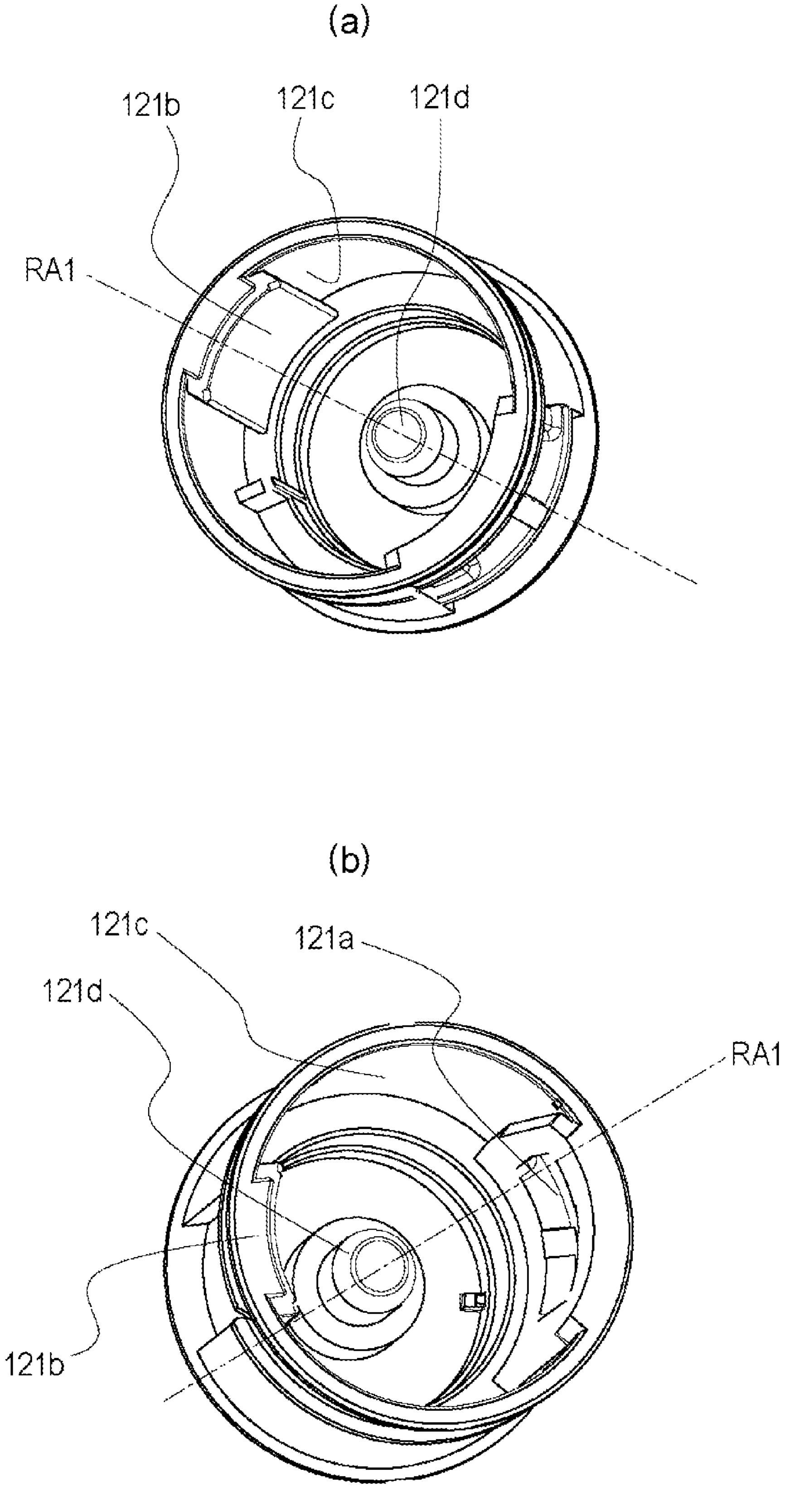

Parts (a) and (b) of FIG. 17 are perspective views each showing a main assembly shutter in the embodiment 1.

Figure 18:
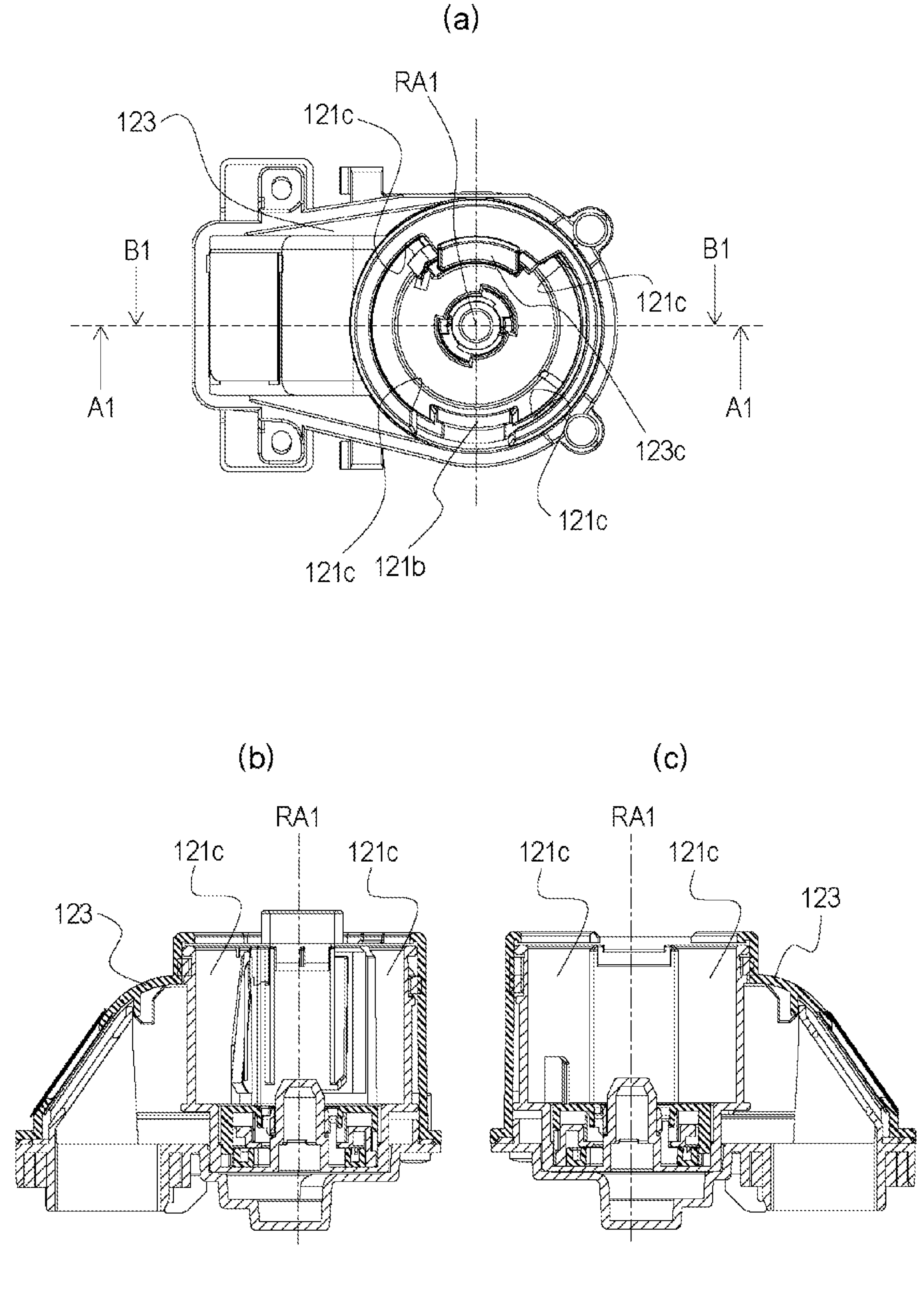

Parts (a) to (c) of FIG. 18 are schematic views of the mounting portion in the embodiment 1, in which part (a) is a top (plan) view, and parts (b) and (c) are sectional views.

Figure 19:
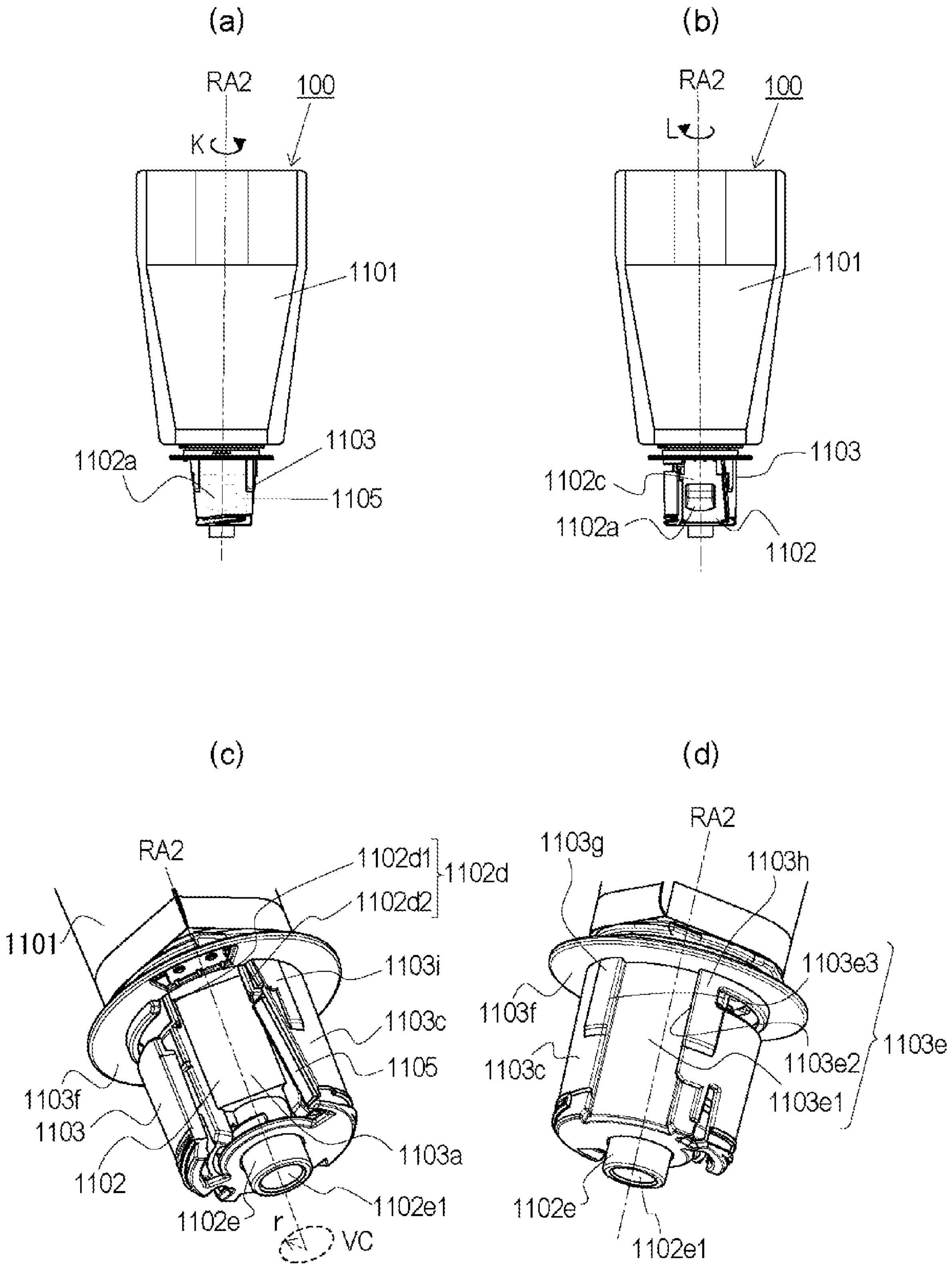

Parts (a) to (d) of FIG. 19 are schematic views of a toner pack in the embodiment 1, in which parts (a) and (b) are front views, and parts (c) and (d) are partially enlarged views.

Figure 20:
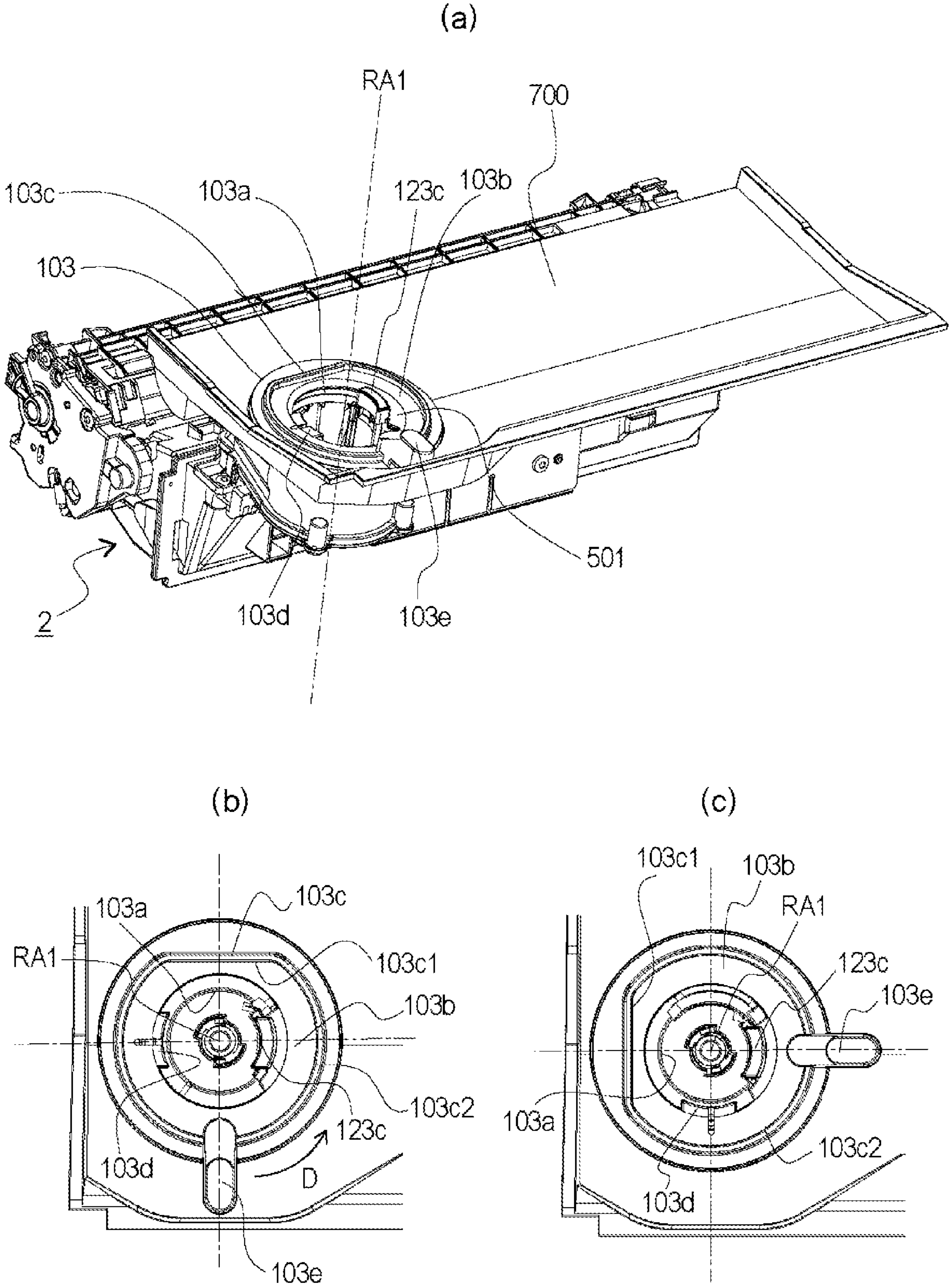

Parts (a) to (c) of FIG. 20 are perspective views each showing a neighborhood of an operating lever of an apparatus main assembly in the embodiment 1.

Figure 21:
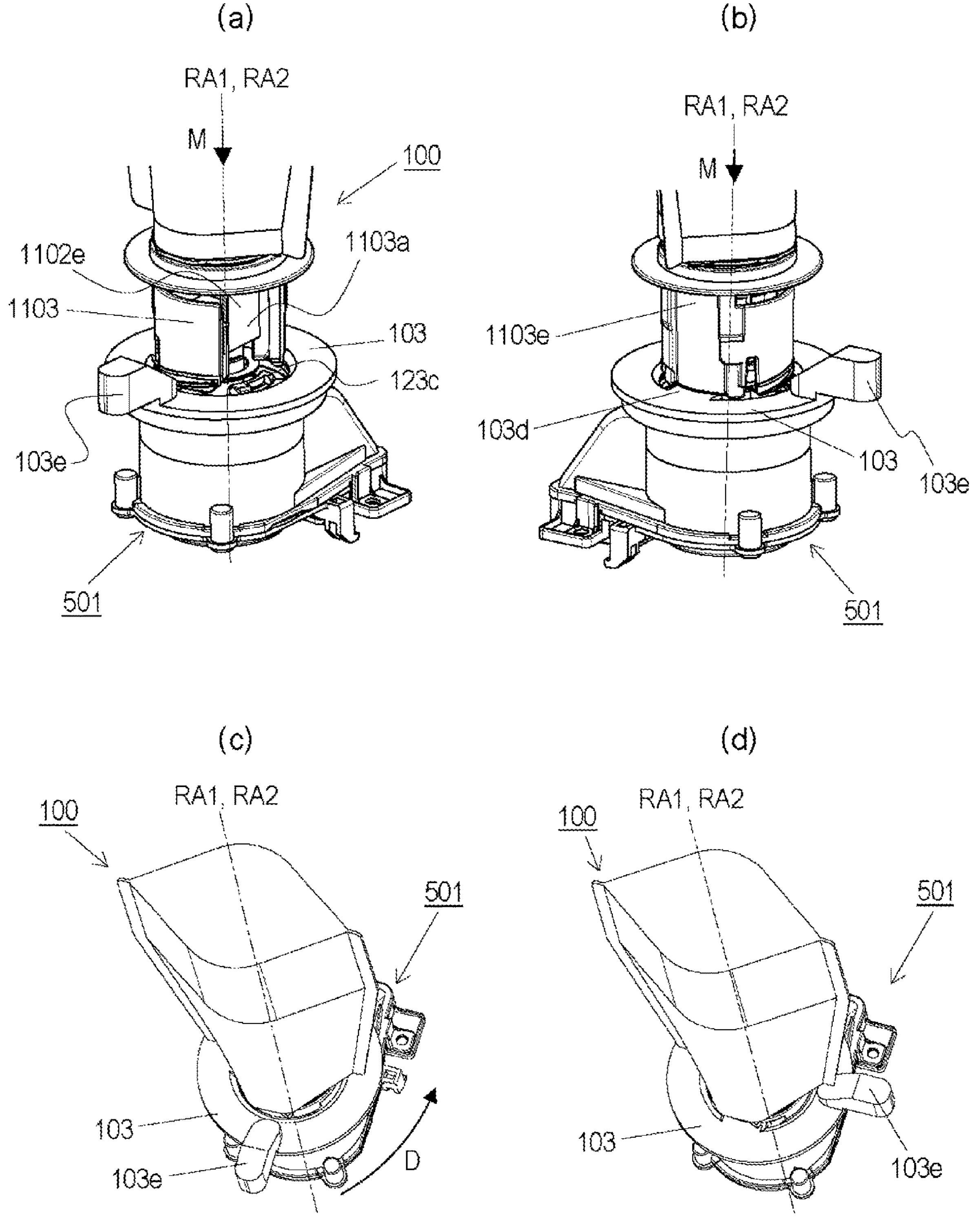

Parts (a) to (d) of FIG. 21 are perspective views each showing the mounting portion and the toner pack in the embodiment 1, in which parts (a) and (b) show a state during mounting of the toner pack to the mounting portion, and parts (c) and (d) show a state in which an operating lever is operated after mounting of the toner pack.

Figure 22:
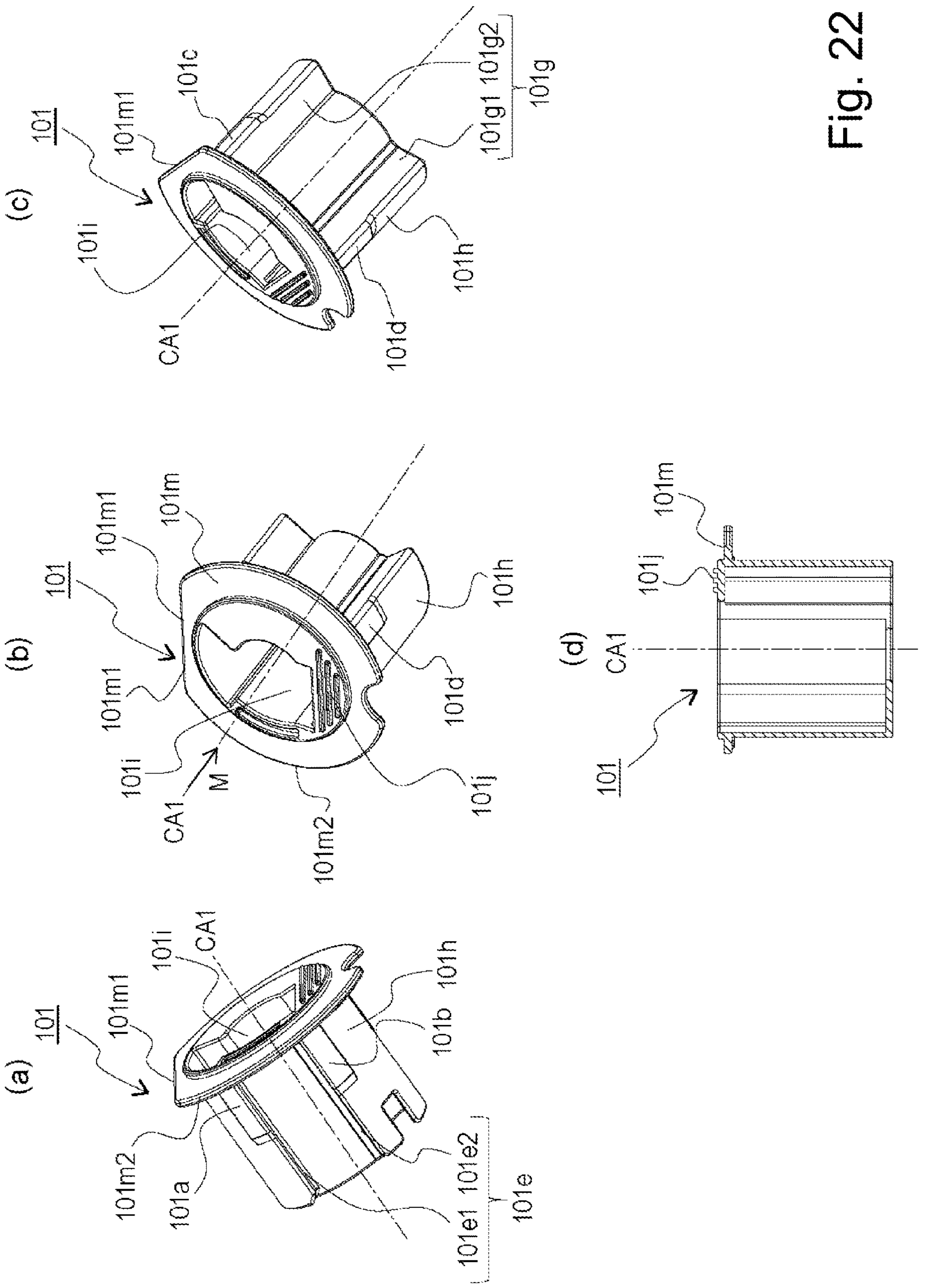

Parts (a) to (d) of FIG. 22 are perspective views of an attachment according to the embodiment 1.

Figure 23:
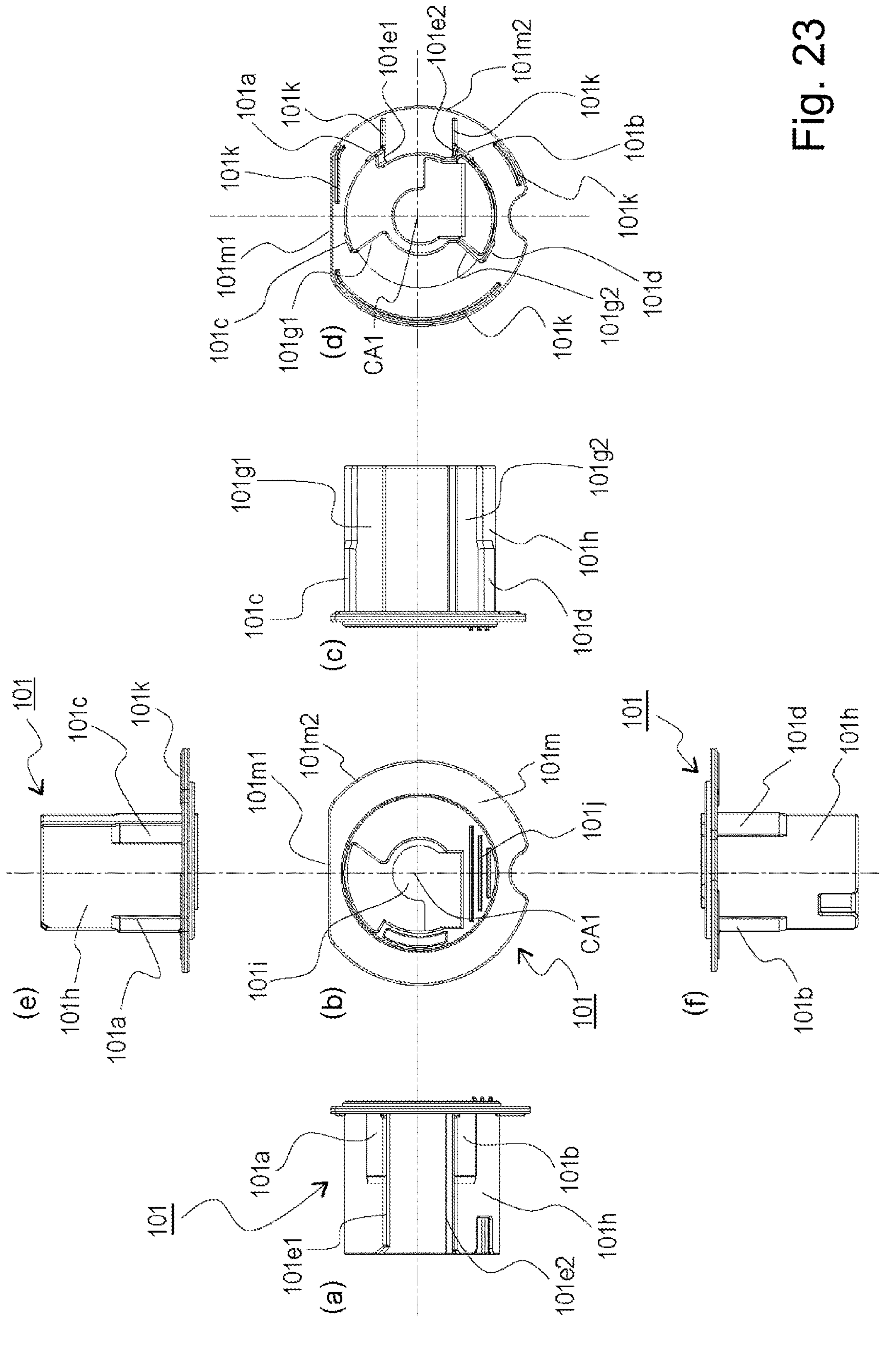

Parts (a) to (f) of FIG. 23 are schematic views of the attachment according to the embodiment 1, in which part (a) is a left side view, part (b) is a top view, part (c) is a right side view, part (d) is a bottom view, part (e) is a rear view, and part (f) is a front view.

Figure 24:
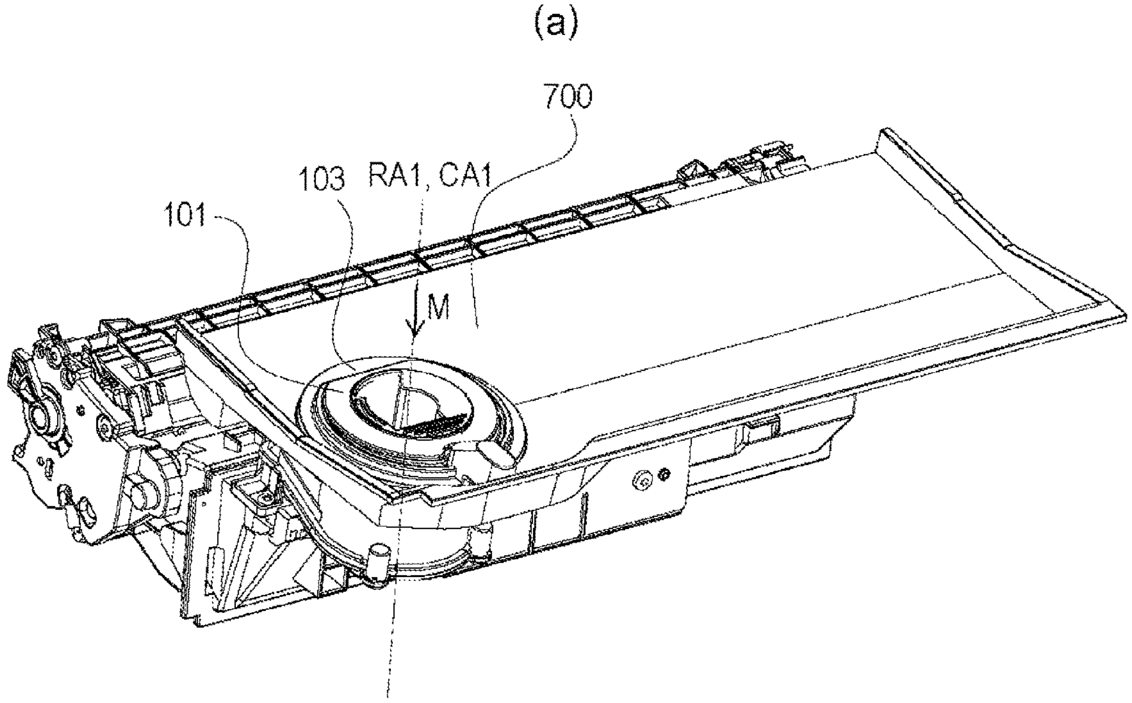
Figure 24:
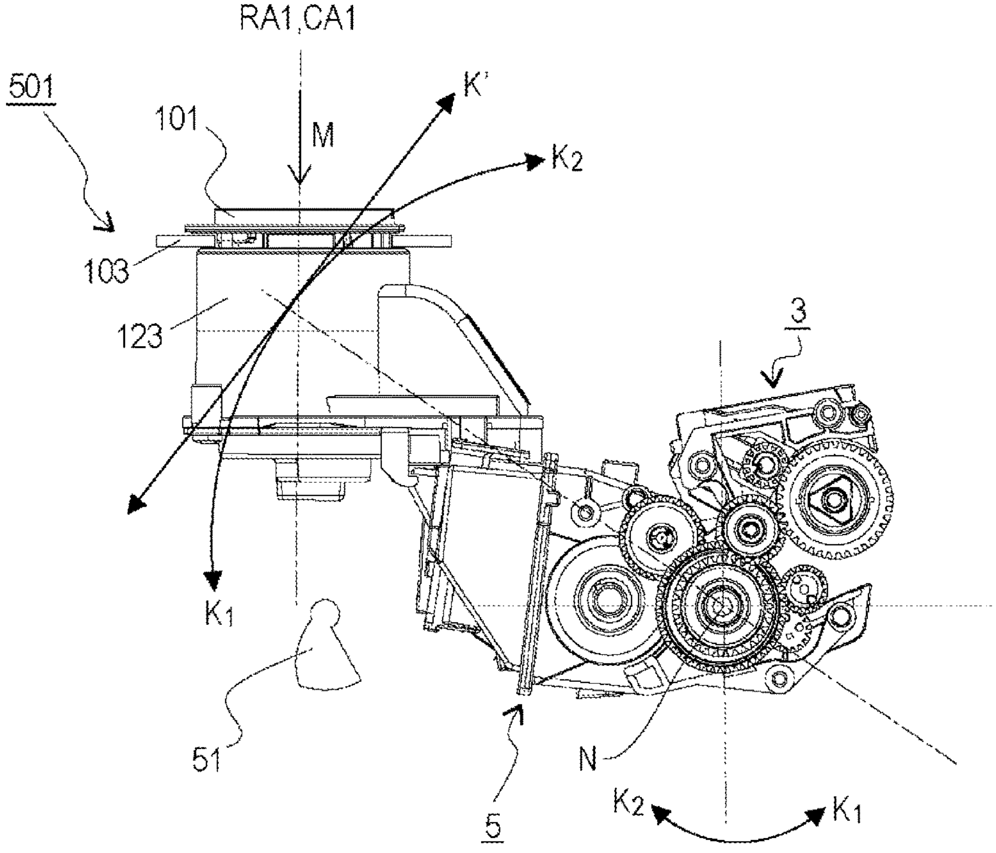

Parts (a) and (b) of FIG. 24 are perspective views showing a neighborhood of the mounting portion to which the attachment is mounted in the embodiment 1.

Figure 25:
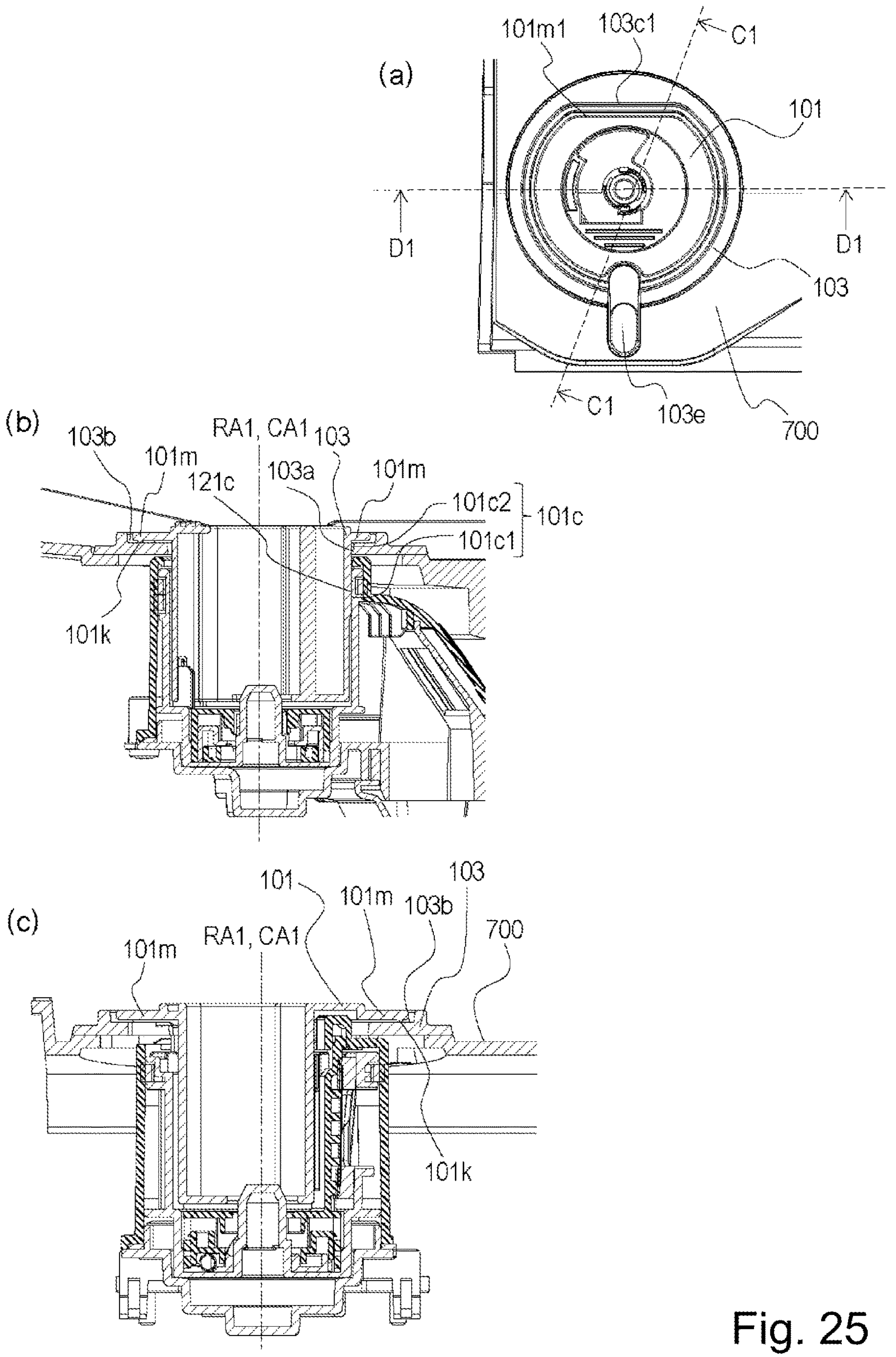

Parts (a) to (c) of FIG. 25 are schematic views each showing the operating lever and the mounting portion to which the attachment is mounted, in which part is a top view, and parts (b) and (c) are sectional view.

Figure 26:
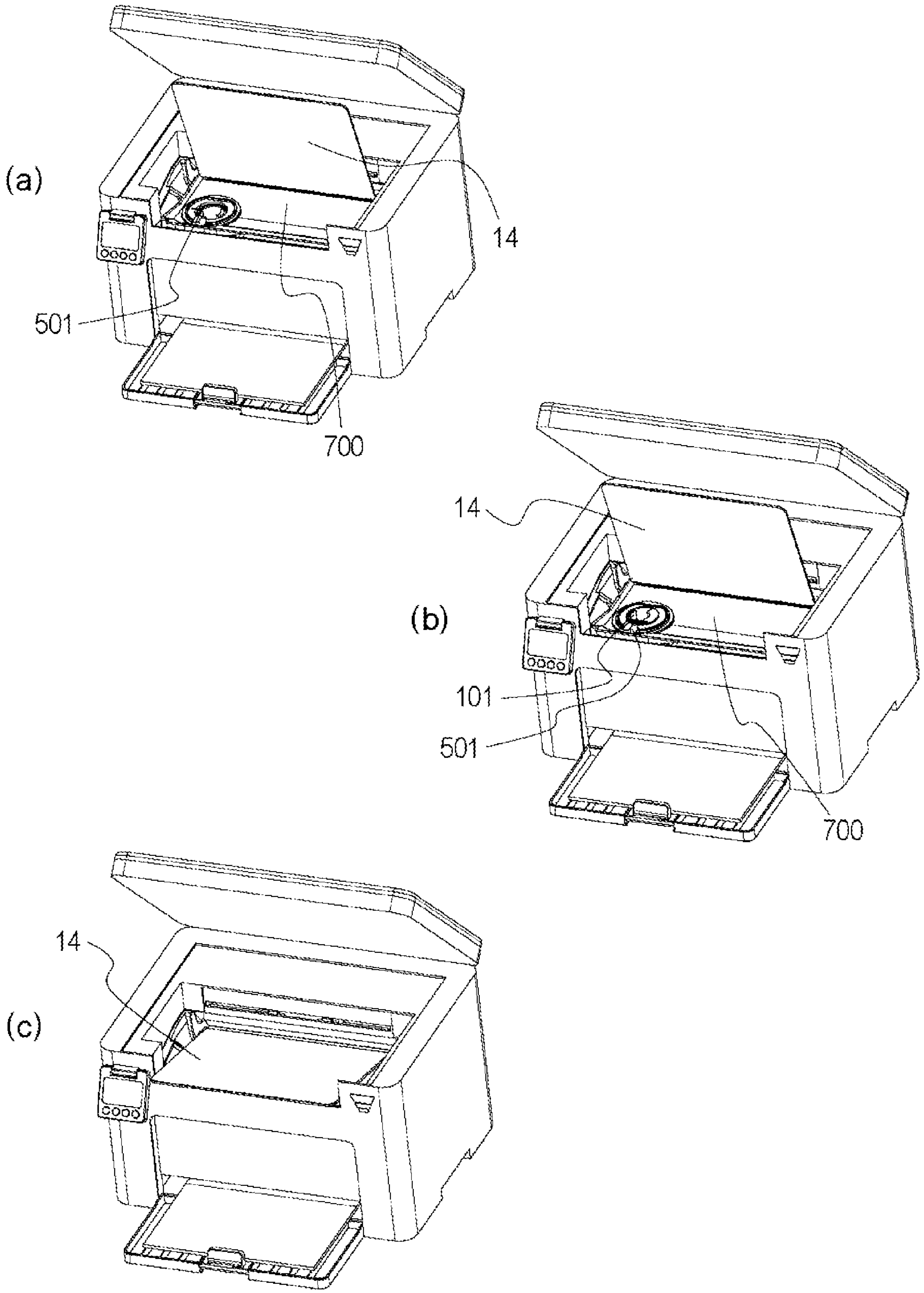

Parts (a) to (c) of FIG. 26 are perspective views of the image forming apparatus in a state in which an openable member is open or closed, in which parts (a) and (b) show an open state, and part (c) shows a closed state.

DESCRIPTION OF THE DRAWINGS

In the following, embodiments of the present invention will be described with reference to the drawings.

Embodiment 1

An embodiment 1 of the present invention will be specifically described on the basis of the drawings.

Figure 1:
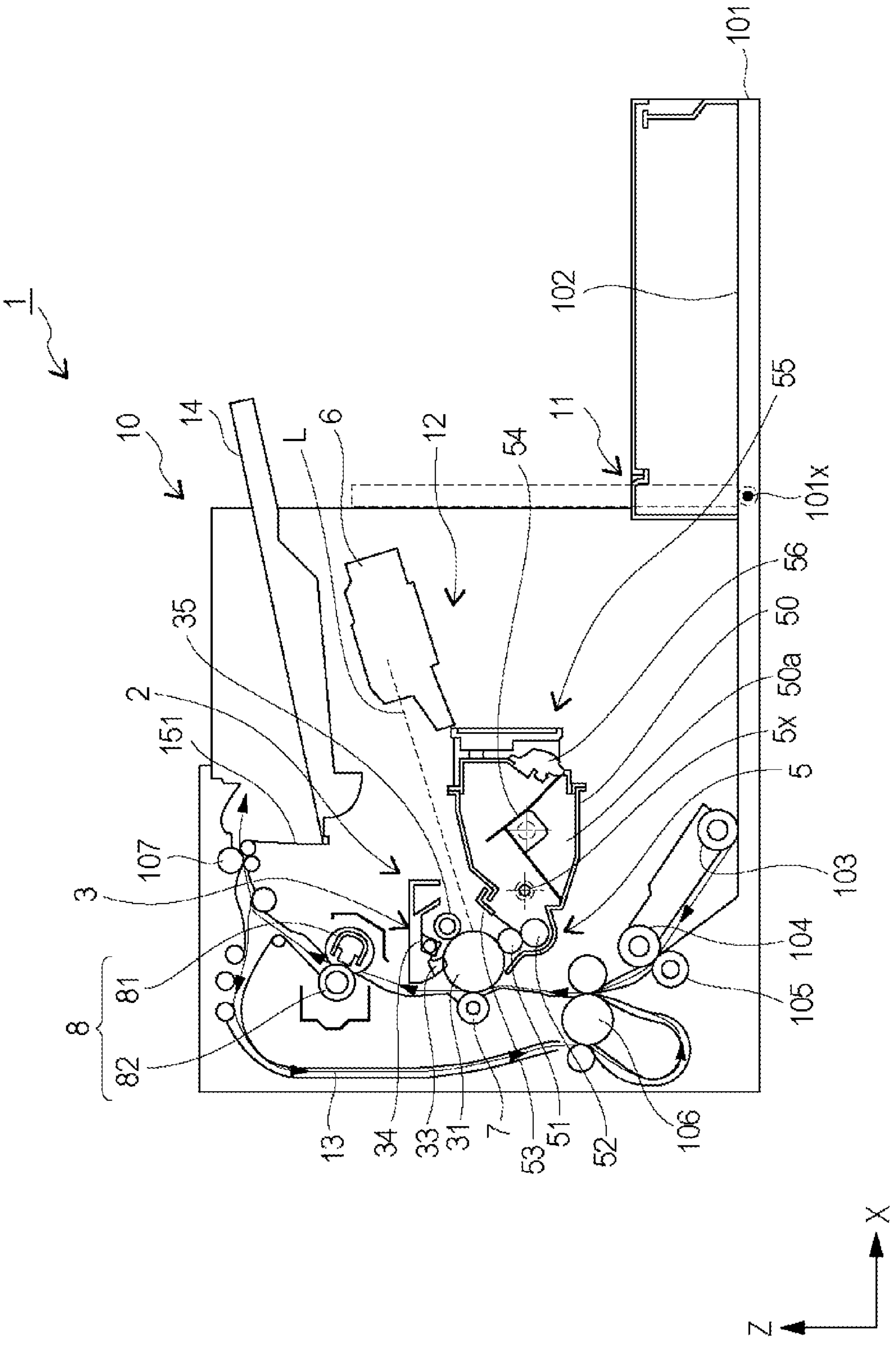
FIG. 1 is a sectional view of an image forming apparatus in an embodiment 1.
Figure 2:
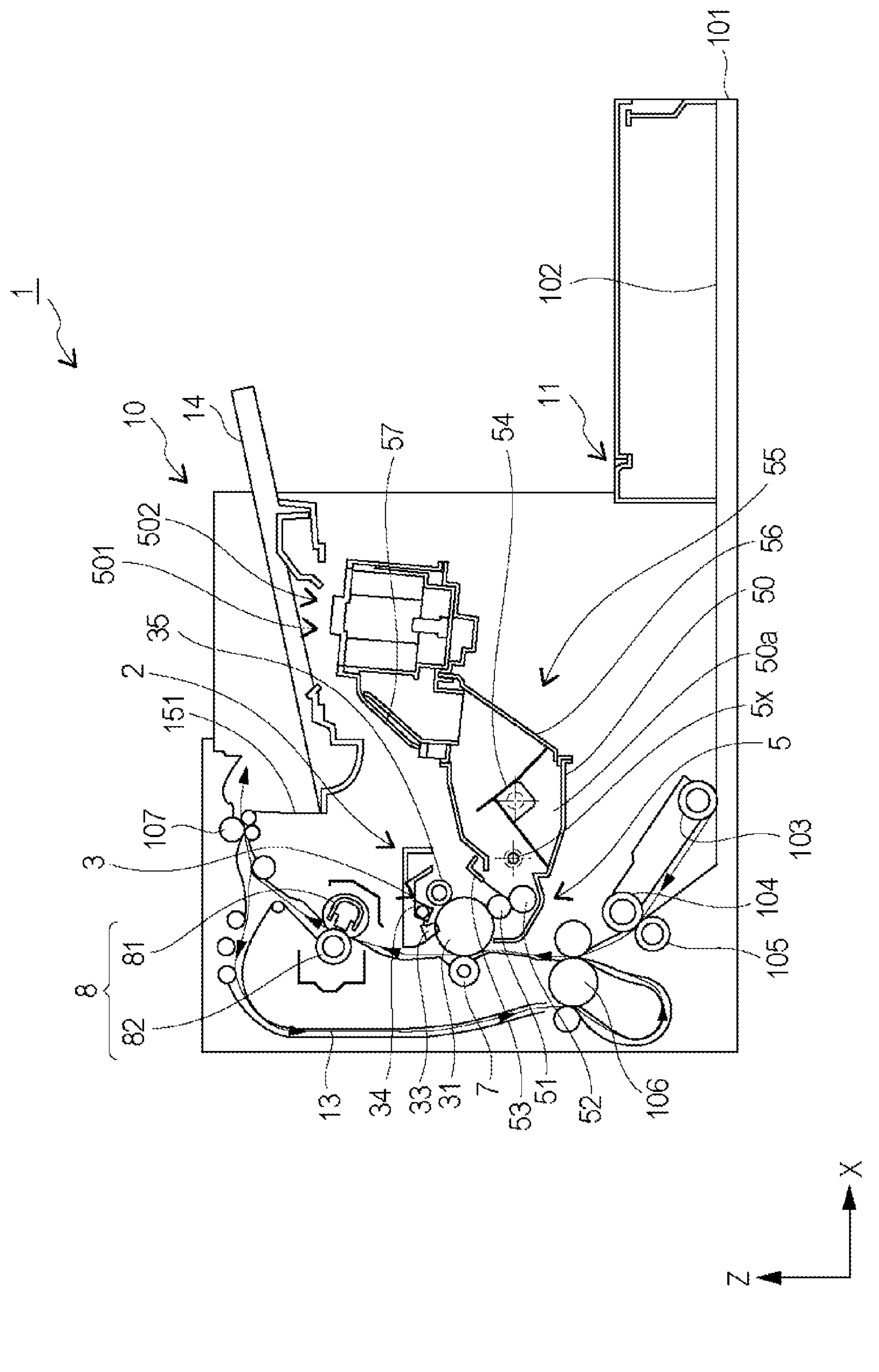
FIG. 2 is a sectional view of the image forming apparatus in the embodiment 1.
Figure 3:
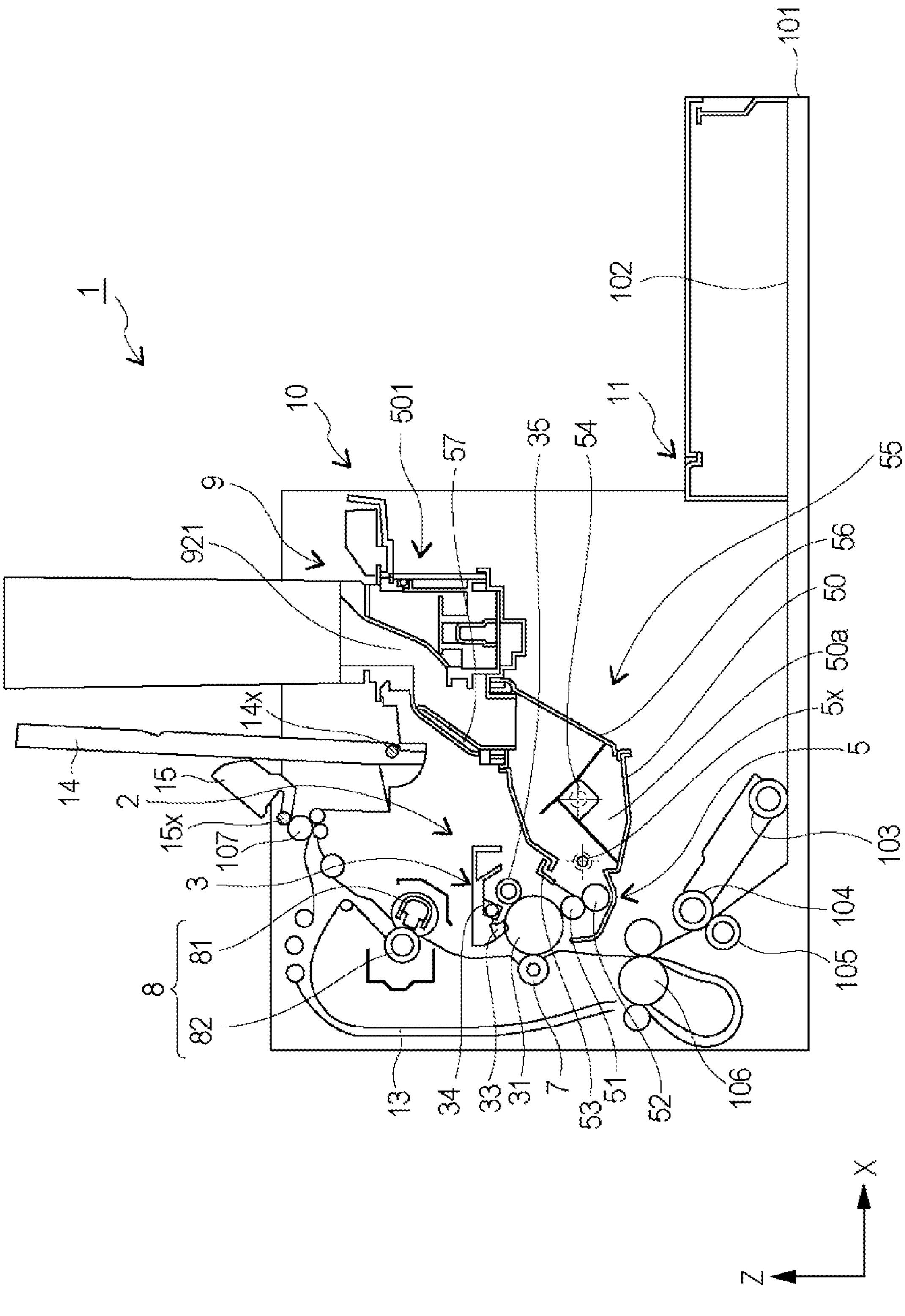
FIG. 3 is a sectional view of the image forming apparatus in the embodiment 1.

A general structure of an image forming apparatus in this embodiment will be described with reference to FIGS. 1 to 3. Each of FIGS. 1 to 3 is a schematic sectional view of an image forming apparatus 1 in this embodiment and shows a cross section perpendicular to a rotational axis of a rotatable member such as a photosensitive drum 31 or the like provided in the image forming apparatus 1. FIGS. 1 to 3 are the sectional views different in position with respect to a direction of the rotational axis (rotational axis direction).

The image forming apparatus 1 in this embodiment is a monochromatic printer for forming an image on a recording material on the basis of image information inputted from an external device. The recording material includes various sheet materials different in material, including paper such as plain paper or thick paper, a plastic film such as a sheet for an overhead projector, a special-shaped sheet such as an envelope or index paper, and a cloth, and the like.

An apparatus main assembly 10 of the image forming apparatus 1 includes an image forming portion 12 for forming a toner image on the recording material, a fixing portion 8 for fixing the toner image, formed by the image forming portion 12, on the recording material, and the like member. The image forming portion 12 includes a scanner unit 6, a process unit 2, and a transfer roller 7. The process unit 2 includes a drum unit 3 and a developing unit 5. The drum unit 3 is a photosensitive member unit including the photosensitive drum 31 which is a photosensitive member on which an electrostatic latent image is formed on the basis of the image information. The drum unit 3 includes the photosensitive drum 31, a charging roller 35, a pre-exposure portion 34, and a brush unit 33. The developing unit 5 includes a developing roller 51 for developing the electrostatic latent image with toner as a developer. The transfer roller 7 forms a transfer portion (transfer nip), between itself and the photosensitive drum 31, in which the toner image as a developer image formed on the photosensitive drum 31 is transferred onto the recording material.

The recording material is stacked on a tray portion 102, and in synchronism with an operation of the image forming portion 12, the recording material is fed toward the transfer portion, where the photosensitive drum 31 and the transfer roller 7 oppose each other, by a pick-up roller 103, a feeding roller 104, a separation roller 105, a feeding (conveying) roller pair 106, and the like.

In the image forming apparatus 1 in this embodiment, on an inside surface of a front door 101, a tray portion 102 is provided. The front door 101 is provided to the apparatus main assembly 10 so as to be rotatable about a rotation shaft 101X extending in Y direction. The front door 101 is capable of taking a closed attitude (standing attitude) which is indicated by a broken line in FIG. 1 and in which a front surface of the image forming apparatus 1 is closed and an open attitude (horizontal attitude) which is indicated by a solid line in FIG. 1 and in which the tray portion 102 is exposed to an outside of the image forming apparatus 1. That is, the tray portion 102 is in a state in which the tray portion 102 is usable by opening (horizontally bringing down) the front door 101, so that the recording material is capable of being stacked on the tray portion 102. Each of FIGS. 1 to 3 shows the image forming apparatus 1 in a state in which the front door 101 is open, and when the image forming apparatus 1 is not used, the front door 101 is closed, so that a sheet feeding portion can be put in a closed state.

The photosensitive drum 31 is a photosensitive member molded in a cylindrical shape. The photosensitive drum 31 includes a photosensitive layer formed with a negatively chargeable organic photosensitive member on a drum-shaped substrate formed of aluminum. Further, the photosensitive drum 31 is rotationally driven at a predetermined process speed in a predetermined rotational direction (clockwise direction in FIGS. 1 to 3) by an unshown motor.

The charging roller 35 rotatably contacts the photosensitive drum 31 and forms a charging portion. A predetermined charging voltage is applied from a charging high-voltage power source to the charging roller 35, so that a surface of the photosensitive drum 31 is electrically charged uniformly to a predetermined potential. The photosensitive drum 31 is negatively charged by the charging roller 35. The pre-exposure portion 34 removes a surface potential of the photosensitive drum 31 before the photosensitive drum surface reaches the charging portion in order to cause stable electric discharge at the charging portion. The brush unit 33 causes a brush portion formed with, for example, a pile fabric to contact the photosensitive drum 31, and collects paper powder or the like generating from the recording material.

The scanner unit 6 subjects the surface of the photosensitive drum 31 to scanning exposure by irradiating the photosensitive drum 31 with laser light corresponding to the image information inputted from the external device, by using a polygon mirror. By this exposure, the electrostatic latent image depending on the image information is formed on the surface of the photosensitive drum 31. Incidentally, the scanner unit 6 is not limited to a laser scanner device, but for example, may employ an LED exposure device including an LED array in which a plurality of LEDs are provided along a longitudinal direction (rotational axis direction, Y direction) of the photosensitive drum 31.

The developing unit 5 includes a developing roller 51 carrying the developer, a developing container 50 which is a frame of the developing unit 5, a supplying roller 52 capable of supplying the developer to the developing roller 51, and a developing blade 53 for regulating an amount of the toner carried on the developing roller 51. The developing roller 51 and the supplying roller 52 are rotatably supported by the developing container 50. The developing roller 51 includes a core metal of a metal material and a rubber portion for forming a rubber layer on an outer peripheral surface of the core metal. The supplying roller 52 includes a core metal of a metal material and an elastic portion for forming an elastic layer on an outer peripheral surface of the core metal. The developing blade 53 is disposed so as to contact the developing roller 51 at a predetermined contact pressure at an opening of the developing container 50 where the developing roller 51 is disposed.

The developing roller 51 is disposed at the opening of the developing container 51 so as to oppose the photosensitive drum 31. The toner as the developer accommodated in the developing container 50 is supplied to the surface of the developing roller 51 by the supplying roller 52 rotating in contact with the developing roller 51. Incidentally, when a constitution in which the toner can be sufficiently supplied to the developing roller 51 is employed, the supplying roller 52 is not necessarily required. The toner supplied to the surface of the developing roller 51 is formed uniformly in a thin layer by passing through an opposing portion to the developing blade 53 with rotation of the developing roller 51, and the toner is negatively charged by triboelectric charge.

The developing unit 5 uses, as a developing type, a contact developing type and a reverse developing type in this embodiment. In the contact developing type, a toner layer carried on the developing roller 51 contacts the photosensitive drum 31 in a developing portion (developing region) where the photosensitive drum 31 and the developing roller 51 oppose each other.

To the developing roller 51, a developing voltage is applied from a developing high-voltage power source. Under application of the developing voltage, the toner carried on the developing roller 51 is transferred from the developing roller 51 onto the surface of the photosensitive drum 31 in accordance with a potential distribution of the surface of the photosensitive drum 31, so that the electrostatic latent image is developed into a toner image. In the reverse developing type, the surface of the photosensitive drum 31 is charged in a charging step, and then is exposed to light in an exposure step, so that an electric charge amount is attenuated in a region. In the region, the toner is deposited on the photosensitive drum surface, so that the toner image is formed in the region.

The developer used in this embodiment is polymerization toner formed by a polymerization method, and is a non-magnetic one-component developer which has a particle size of 6 μm and a negative polarity as a normal charge polarity, which does not contain a magnetic component, and which is carried on the developing roller 51 by principally an intermolecular force or an electrostatic force (mirror force). Incidentally, as the developer, a one-component developer containing the magnetic component may be used. Further, in the one-component developer, in addition to toner particles, additives (for example, wax and silica fine particles) for adjusting flowability and charging performance of the toner. Further, as the developer, a two-component developer constituted by non-magnetic toner and a magnetic carrier may be used. In the case of using a developer having a magnetic property, as a developer carrying member, a cylindrical developing sleeve in which a magnet is provided may be used.

The developing container 50 includes a toner accommodating chamber 50*a* for accommodating the toner. Inside the toner accommodating chamber 50*a*, a stirring member 54 (toner feeding member) is provided. The stirring member 54 is rotatably supported in the toner accommodating chamber 50*a*, and not only stirs the toner in the developing container 50 but also feeds the toner toward the developing roller 51 and the supplying roller 52. Further, the stirring member 54 has a function of causing the toner peeled off from the developing roller 51 without being used for the development to circulate in the developing container 50 so as to be uniformized in the developing container 50. Incidentally, the form of the stirring member 54 is not limited to a rotatable form. For example, a stirring member in a swingable form may be employed.

An image forming operation will be described. When an image forming instruction is inputted to the apparatus main assembly 10, an image forming process by the image forming portion 12 is started on the basis of the image information inputted from an external computer connected to the apparatus main assembly 10. On the basis of the inputted image information, the scanner unit 6 irradiates the photosensitive drum 31 with laser light L. At this time, the photosensitive drum 31 is charged in advance by the charging roller 35 and is irradiated with the laser light L, so that the electrostatic latent image is formed on the photosensitive drum 31. Thereafter, this electrostatic latent image is developed by the developing roller 51, so that the toner image is formed on the photosensitive drum 31.

In parallel to the above-described image forming process, the recording material is fed from the tray portion 102 by the pick-up roller 103 and is conveyed toward the transfer portion (transfer nip) formed by the transfer roller 7 and the photosensitive drum 31.

To the transfer roller 7, a transfer voltage is applied from a transfer high-voltage power source, so that the toner image carried on the photosensitive drum 31 is transferred onto the recording material. The recording material on which the toner image is transferred is passed through the fixing portion 8 including a fixing film 81, a pressing roller 82, and the like. At this time, the toner image is heated and pressed on the recording material.

By this, toner particles are melted and then fixed, so that the toner image is fixed on the recording material.

The recording material passed through the fixing portion 8 is discharged to an outside of the apparatus main assembly 10 (the image forming apparatus 1) by a discharging roller pair 107 as a discharging means, and is stacked on a discharge tray 14 as a stacking portion formed at an upper portion of the apparatus main assembly 10. On the other hand, toner remaining on the photosensitive drum 31 without being transferred onto the recording material is charged by the charging roller 35 and then is collected by the developing roller 51. The collected toner is used again for performing the image forming process. Thus, in a constitution in which the toner remaining on the photosensitive drum 31 is collected by the developing roller 51, compared with a constitution in which the toner remaining on the photosensitive drum 31 is collected by a so-called cleaning blade, a force required for rotating the photosensitive drum 31 becomes small.

The image forming apparatus 1 in this embodiment is provided with a double-side feeding (conveying) passage 13 and is constituted so that images can be formed on double sides of the recording material. Double-side feeding along the double-side feeding passage 13 (i.e., double-side feeding such that the recording material is turned upside down so as to form the images on the double sides of the recording material) is carried out by switching of a flapper and reverse rotation of the discharging roller pair 107. That is, the recording material on which the toner image is transferred on one of a front side and a back-side thereof and then is fixed at the fixing portion 8, is not discharged to the discharge tray 14, and the feeding direction of the recording material is reversed by switching a rotational direction of the discharging roller pair 107. At this time, an attitude of the flapper constituting a feeding path between the fixing portion 8 and the discharging roller pair 107 is changed, so that the recording material is guided so as to move toward double-side feeding passage 13, not toward the fixing portion 8. By this, not only the recording material is returned to a side upstream of the transfer portion along the feeding path, but also the surface on which the toner image is to be transferred from the photosensitive drum 31 is changed from one surface on which the toner image is transferred to the other surface which is a back surface of the one surface.

The image forming apparatus 1 in this embodiment is constituted so that a remaining toner amount in the developing container 50 can be detected. The developing unit 5 includes a remaining toner amount sensor 55 which is an optical sensor. The remaining toner amount sensor 55 emits detection light to an inside of the developing container 50 through a light guiding member 56 incorporated in a part of a wall portion of the developing container 50 and receives the detection light returned by being reflected depending on the retaining toner amount in the developing container 50. The remaining toner amount can be detected on the basis of a light quantity of the detection light received by the remaining toner amount sensor 55. Incidentally, a detecting constitution of the remaining toner amount is not limited to the optical sensor, but for example, may be a detecting constitution in which the remaining toner amount in the developing container 50 is detected on the basis of electrostatic capacity detected by an electrode provided in the wall portion of the developing container 50.

FIG. 2 is a schematic sectional view of the image forming apparatus 1 in a state in which a toner pack 100 is not mounted to the apparatus main assembly 10 and in which the image forming operation can be executed. FIG. 3 is a schematic sectional view of the image forming apparatus 1 in a state in which the toner pack 100 is mounted to the apparatus main assembly 10 and in which the toner can be supplied.

The developing unit 5 includes a mounting portion 501 to which the toner pack 100 is detachably mountable. The toner pack 100 accommodates the toner for being supplied to the developing unit 5. As shown in FIGS. 1 and 2, during the image forming operation, the mounting portion 501 is covered with the discharge tray 14 and is not exposed to the outside of the apparatus main assembly 10. A position of the discharge tray 14 at this time is a closed position. When the toner is supplied by the toner pack 100, during non-image formation, as shown in FIG. 3, the discharge tray 14 and a restricting portion 15 are rotated, so that the mounting portion 501 is exposed to the outside of the apparatus main assembly 10. The position of the discharge tray 14 at this time is an open position. When the discharge tray 14 is in the open position, the toner pack 100 is mounted to the mounting portion 501. That is, the discharge tray 14 also functions as an openable cover (openable member) covering the mounting portion 501. In a state in which the toner pack 100 is mounted to the mounting portion 501, the discharge tray 14 cannot be moved to the closed position.

The discharge tray 14 is provided to the apparatus main assembly 10 so as to be rotatable about a rotation shaft 14*x* parallel to the Y direction. The restricting portion 15 has a restricting surface 151 for restricting a trailing end of the recording material discharged on the discharge tray 14 and is provided to the apparatus main assembly 10 so s to be rotatable about a rotation shaft 15*x* parallel to the Y direction. The discharge tray 14 and the restricting portion 15 are constituted so as to take a closed attitude for enabling discharge of the recording material during the image formation as shown in FIGS. 1 and 2 and so as to take an open attitude for enabling mounting of the toner pack 100 to the mounting portion 501 as shown in FIG. 3 when the toner is supplied.

As shown in FIG. 3, when the toner pack 100 is mounted to the mounting portion 501, a toner discharge opening 921 of the toner pack 100 communicates with the toner accommodating chamber 50*a* of the developing container 50, so that the toner accommodated in the toner pack 100 is capable of being supplied to the toner accommodating chamber 50*a*. The developing container 50 is provided with an air-permeable sheet 57 for permitting deaeration.

With reference to FIGS. 4 to 8, the process unit 2 in this embodiment will be described. Part (a) of FIG. 4 is a schematic view showing a front side of the process unit 2 in a state in which an up-down direction (Z direction) is reversed. Part (b) of FIG. 4 is a plan view (top view) of the process unit 2. Part (c) of FIG. 4 is a schematic view showing a right-surface-side (driving-side side surface) of the process unit 2. Part (d) of FIG. 4 is a schematic view showing a left-surface-side (non-driving-side side surface) of the process unit 2. Part (a) of FIG. 5 is a rear view of the process unit 2. Part (b) of FIG. 5 is a bottom view of the process unit 2. Part (a) of FIG. 6 is a perspective view of the process unit 2 as viewed from an obliquely upper-left rear side. Part (b) of FIG. 6 is a perspective view of the process unit 2 as viewed from an obliquely lower-right front side. Parts (a) and (b) of FIG. 7 are sectional views of the process unit 2 at a longitudinal center position of the process unit 2, in which part (a) shows a cross section as viewed from a left-side, and (b) shows a cross section as viewed from a right side. Parts (a) and (b) of FIG. 8 are sectional views of the process unit 2 at a longitudinal center of the mounting portion 501 for mounting the toner pack 100, in which part (a) shows a cross section as viewed from a left side, and part (b) shows a cross section as viewed from a right side.

FIGS. 4 to 6 are the schematic views showing a state in which the process unit 2 is in an image forming attitude (an attitude in which the image forming operation can be performed) in the apparatus main assembly 10.

The developing unit 2 in the image forming attitude takes an attitude such that the developing unit 5 is inclined about the rotation center 5X on a side where the mounting portion 501 to which the toner pack 100 is mounted is disposed when compared with an attitude-to-be-supplied.

As shown in FIGS. 4 to 6, the process unit 2 includes the drum unit 3 and the developing unit 5.

The developing unit 3 is constituted by the photosensitive drum 31, the brush unit 33, the pre-exposure portion 34, the charging roller 35, a drum frame 30, a driving-side cover member 302, and a non-driving-side cover member 303.

The photosensitive drum 31 is shaft-supported at a driving-side end portion by the driving-side cover member 302 and is shaft-supported at a non-driving-side end portion by the non-driving-side cover member 303. On one end side (driving side, +Y direction side end portion) of the photosensitive drum 31 with respect to the longitudinal direction (rotational axis direction, Y direction), a drum driving member (drive receiving portion) 32 for rotating the photosensitive drum 31 is provided. The drum driving member 32 is an input means for inputting a rotational driving force from a power source, such as a motor provided in the apparatus main assembly 10, to the photosensitive drum 31. The drum driving member 32 includes a coupling portion and a gear portion at a periphery of the coupling portion.

The charging roller 35 is supported by the drum frame 30 so that the charging roller 35 can be rotated in contact with the photosensitive drum 31. The charging roller 35 includes a charging roller gear on the one end side (driving side, +Y direction side end portion), i.e., on a side where the drum driving member 32 for rotating the photosensitive drum 31 is provided.

The charging roller gear engages with the gear portion of the drum driving member 32, so that the charging roller 35 is rotated by receiving a rotational force of a driving motor (not shown) of the apparatus main assembly 10 through the drum driving member 32.

On the non-driving side, a drum contact 311 which is an end portion of a shaft portion of the photosensitive drum 31 is exposed from the non-driving-side cover member 303. Further, on the driving side, a charging contact 351 of the charging roller 35 and a brush contact 331 of the brush unit 33 are exposed from the drum frame 30. Through these contacts, predetermined high voltages are applied to the respective members from the high-voltage power sources provided in the apparatus main assembly 10.

The developing unit 5 is constituted by the developing roller 51, the supplying roller 52, the developing blade 53, the stirring member 54, the developing container 50, a driving-side bearing 502, a non-driving-side bearing 503, a developing cover member 504, and the like.

The developing roller 51 is shaft-supported at a driving-side end portion by the driving-side bearing 502 and is shaft-supported at a non-driving-side end portion by the non-driving-side bearing 503. The supplying roller 52 is also shaft-supported at a driving-side end portion by the driving-side bearing 502 and is also shaft-supported at a non-driving-side end portion by the non-driving-side bearing 503. The developing unit 5 includes a developing driving member for receiving a rotational force transmitted from a transmitting member. The transmitting member is constituted so that the rotational force received by the drum driving member 32 is transmitted to the developing driving member of the developing unit 5. That is, by a driving force inputted to the drum driving member 32, the photosensitive drum 31 is rotationally driven, and in addition, through an unshown gear train, the driving force is transmitted to the charging roller 35, the developing roller 51, the supplying roller 52, and the stirring member 54, so that these members are rotationally driven. Such a drive transmission mechanism is assembled between the driving-side bearing 502 and the developing cover member 504.

As regards the developing unit 5, on the driving side, a developing contact 511 of the developing roller 51 and a supplying contact 521 of the supplying roller 52 are exposed from the developing container 50. Through these contacts, predetermined voltages are applied to the respective members from high-voltage power source provided in the apparatus main assembly 10.

The developing unit 5 is constituted so as to be moved (rotated) between a contact position (developable state) where the developing roller 51 is contacted to the photosensitive drum 31 and a separated position where the developing roller 51 is separated from the photosensitive drum 31. Between the developing unit 5 and the drum unit 3, a developing pressing spring 305 is provided, so that the developing unit 5 is urged to the drum unit 3 in a direction, in which a contact state is formed, by an urging force of the developing pressing spring 305.

As shown in FIGS. 7 and 8, the developing container 50 includes a developing container cap portion 510 and a developing container frame 520. The developing container cap portion 510 is provided with the remaining toner amount sensor 55 and the light-guiding member 56. The developing container frame 520 is provided with various process members in the developing unit 5, such as the developing roller 51, the supplying roller 52, the developing blade 53, the stirring member 54, and the like.

A frame-side welding portion 5201 of the developing container frame 520 and a first cap-side welding portion 5101 of the developing container cap portion 510 and bonded to each other by ultrasonic welding. Further, a second cap-side welding portion 5102 of the developing container cap portion 510 and a light-guiding portion welding portion 5601 of the light-guiding member 56 are bonded to each other by ultrasonic welding.

The mounting portion 501 is provided on the frame 513 mounted to the developing container cap portion 510.

The frame 513 is provided with a toner supplying passage 513*a* for guiding the toner, supplied from the toner pack 100 mounted to the mounting portion 501, to the toner accommodating chamber 50*a* of the developing container 50. The frame 513 is provided with a through hole in a part of a wall portion forming the toner supplying passage 513*a*, and the air-permeable sheet 57 is mounted to the frame 513 so as to close the through hole, and in addition, an auxiliary scattering-preventing sheet 58 is mounted to an outside of the air-permeable sheet 57.

As shown in FIGS. 4 to 6 and the like, the mounting portion 501 and the frame 513 are provided on a side close to a non-driving side with respect to the longitudinal direction of the developing container 50.

(Drum Unit)

A constitution of the drum unit 3 will be described using FIG. 9. FIG. 9 is an exploded perspective view of the drum unit 3. The drum unit 3 includes the photosensitive drum 31, the charging roller 35, the drum frame 30, the driving-side cover member 302, and the non-driving-side cover member 303.

On one end side of the photosensitive drum 31 with respect to the longitudinal direction, the drum driving member 32 for receiving a driving force, for rotating the photosensitive drum 31, from the image forming apparatus 1 is provided. The drum driving member 32 includes a coupling portion 32*a* and a gear portion 32*b* which are provided about the rotational axis of the photosensitive drum 31.

Further, longitudinal opposite end portions of the photosensitive drum 31 are rotatably supported by the driving-side cover member 302 and the non-driving-side cover member 303, respectively, of the drum unit 3. The driving-side cover member 302 is provided with a supporting hole 302*a* for supporting an outer peripheral surface of the coupling portion 32*a* of the drum driving member 32. The non-driving-side cover member 303 is provided with a supporting shaft 303*a* engaging with a hole (not shown) of the photosensitive drum 31 on the other end side with respect to the longitudinal direction of the photosensitive drum 31. The driving-side cover member 302 and the non-driving-side cover member 303 are fixed to the drum frame 30 by screws or an adhesive, or the like.

A coupling (not shown) as a drum drive outputting portion of the image forming apparatus 1 engages with the coupling portion 32*a* of the drum driving member 32, and the coupling portion 32 receives the driving force of a driving motor (not shown) of the image forming apparatus 1, so that the photosensitive drum 31 is rotated.

The charging roller 35 is supported by the drum frame 30 so as to be rotatable in contact with the photosensitive drum 31. The charging roller 35 is provided with a charging roller gear 40 at one end portion thereof with respect to the longitudinal direction, and is rotated by engagement of the charging roller gear 40 with the gear portion 32*b* of the drum driving member 32.

Parts (a) and (b) of FIG. 10 are exploded perspective views of the driving-side cover member 302. As shown in FIG. 10, the driving-side cover member 302 includes a cylindrical supporting portion 302*b* and a supporting hole 302*c*. The supporting portion 302*b* engages with a hole 41*a* of an input member 41, and thus rotatably supports the input member 41. The input member 41 includes a coupling portion 41*c* and a gear portion 41*b* which transmit a rotational force to the developing driving member 45 supported by the developing unit 5.

A gear supporting member 42 shown in FIG. 10 includes a cylindrical supporting portion 42*a*. The supporting portion 42*a* of the gear supporting member 42 engages with a hole 43*a* of an idler gear 43 and the supporting hole 302*c* of the driving-side cover member 302. Further, the gear supporting member 42 is fixed to the driving-side cover member 302. By this, the driving-side cover member 302 rotatably supports the idler gear 43. The gear supporting member 42 is fixed to the driving-side cover member 302 by unshown screws, adhesive, or the like. The idler between 43 includes a gear portion 43*b*. The gear portion 43*b* of the idler gear 43 rotatably supported by the driving-side cover member 302 is constituted so as to be engaged with the gear portion 41*b* of the input member 41. As a result, the idler gear 43 is capable of transmitting the driving force to the input member 41. Further, as shown in FIG. 9, when the driving-side cover member 302 is fixed to the drum frame 30, the gear portion 32*b* of the drum driving member 32 engages with the gear portion 43*b* of the idler gear 43, so that the drum driving member 32 is capable of transmitting the rotational force to the idler gear 43. That is, the rotational force received from the image forming apparatus 1 by the drum driving member 32 can be transmitted to the input member 41 through the idler gear 43.

(Developing Unit)

A constitution of the developing unit 5 will be described using parts (a) and (b) of FIG. 11. Parts (a) and (b) of FIG. 11 are exploded perspective views of the developing unit 5. Part (a) of FIG. 11 is the exploded perspective view showing an assembling state of the driving-side bearing 502 and the non-driving-side bearing 503 which support the developing roller 51, and the stirring member 54. Part (b) of FIG. 11 is the exploded perspective view showing an assembling state of a plurality of gears and the developing cover member 504 of the developing unit 5.

As shown in FIG. 11, the developing unit 5 includes the developing roller 51, the developing blade 53, and the developing container 50. The developing container 50 includes the toner accommodating portion 36 for accommodating the toner supplied to the developing roller 51 and to which the developing blade 53 for regulating a layer thickness of the toner on the outer peripheral surface of the developing roller 51 is mounted. The developing blade 53 is prepared by bonding an elastic member 53*b* which is about 0.1 mm-thick sheet-like metal material to a supporting member 53*a* which has an L-shape and which is formed of metal, by welding or the like. The developing blade 53 is fixed to the developing container 50 by a fastening member such as screws at one end portion and the other end portion with respect to the longitudinal direction, and the elastic member 53*b* is contacted to the developing roller 51 by a predetermined pressure, so that the developing blade 53 regulates the layer thickness of the toner on the outer peripheral surface of the developing roller 51. That is, during rotation of the developing roller 51, a frictional force is generated between the developing roller 51 and the developing blade 53, so that a rotational load is exerted on the developing roller 51.

As shown in part (a) of FIG. 11, the opposite end portions of the core metal 51*a* of the developing roller 51 are rotatably supported by the supporting hole 502*b* of the driving-side bearing 502 and the supporting hole 503*b* of the non-driving-side bearing 503, respectively, provided at opposite end portions of the developing container 50 with respect to the longitudinal direction. Further, the opposite end portions of the core metal 52*a* of the supplying roller 52 are rotatably supported by the supporting hole 502*c* of the driving-side bearing 502 and the supporting hole 503*c* of the non-driving-side bearing 503, respectively. Further, as shown in part (b) of FIG. 11, at a longitudinal one end portion of the core metal 51*a* of the developing roller 51, a developing roller gear 39 for receiving the driving force for rotating the developing roller 51 is mounted. Further, at a longitudinal one end portion of the core metal 52*a* of the supplying roller 52, a supplying roller gear 44 for receiving the driving force for rotating the supplying roller 52 is mounted.

Parts (a) and (b) of FIG. 12 are perspective views of the developing driving member 45. The developing unit 5 includes the developing driving member 45 provided with a coupling portion 45*d*. The coupling portion 45*d* engages with the coupling portion 41*c* of the input member 41 and receives the driving force. Further, around the coupling portion 45*d*, the developing driving member 45 includes a first gear portion 45*a* and a second gear portion 45*b*. Further, inside the first gear portion 45*a* and the second gear portion 45*b*, a hole 45*c* is provided.

As shown in part (b) of FIG. 11, the driving-side bearing 502 includes a cylindrical supporting portion 502*a*, which engages with the hole 45*c* of the developing driving member 45. Further, the developing cover member 504 is provided with a hole 504*a*, which engages with an outer peripheral surface of the coupling portion 45*d* of the developing driving member 45. Thus, the developing driving member 45 is rotatably supported by the driving-side bearing 502 and the developing cover member 504.

Further, the first gear portion 45*a* of the developing driving member 45 thus rotatably supported by the developing unit 5 engages with the developing roller gear 39, and transmits the driving force to the developing roller gear 39. Further, the second gear portion 45*b* of the developing driving member 45 engages with the supplying roller gear 44, and transmits the driving force to the supplying roller gear 44. That is, these gear portions are capable of transmitting the rotational forces, received from the input member 41 by the developing driving member 45, to the developing roller gear 39 and the supplying roller gear 44, and thus are capable of rotating the developing roller 51 and the supplying roller 52.

The developing container 50 includes the toner accommodating chamber 36 in which the stirring member 54 is provided. The stirring member 54 is constituted by a sheet-like stirring elastic member 54*a* and a stirring shaft 54*b* to which one end of the stirring elastic member 54*a* is fixed. As shown in part (a) of FIG. 11, at one end of the stirring shaft 54*b* with respect to the longitudinal direction, a cylindrical supporting portion 54*c* is provided, and the other end of the stirring shaft 54*b*, a supporting hole 54*d* is provided. The stirring member 54 provided inside the toner accommodating chamber 36 engages at the supporting portion 54*c* with an arcuate portion 50*b* provided on an inner wall of the developing container 50 and engages at the supporting hole 54*d* with a rectangular prism-shaped supporting portion 48*a* of a stirring gear 48 provided from an outside of the developing container 50, and thus is rotatably supported. As shown in part (a) of FIG. 11, the developing container cap portion 510 is fixed to the developing container frame 520 by the ultrasonic welding, the adhesive, or the like, so that the developing container 50 forms the toner accommodating chamber 36. On the developing cap portion 510, the mounting portion 501 including the toner passage communicatable with the toner accommodating chamber 36 is disposed. The developing unit 5 in this embodiment is capable of replenishing (supplying) the toner to the toner accommodating chamber 36 by mounting the toner pack 100 to this mounting portion 501.

The stirring gear 48 includes a gear portion 48*b*, and an inner peripheral surface of the gear portion 48*b* engages with an annular supporting portion 50*d* of the developing container 50 as shown in part (a) of FIG. 11, so that the stirring gear 48 is rotatably supported by the developing container 50. As shown in part (b) of FIG. 11, a stirring idler gear 47 includes a first gear portion 47*a* and a second gear portion 47*b*, and includes a hole 47*c* penetrating an inside of the first gear portion 47*a* and the second gear portion 47*b*. The hole 47*c* is rotatably supported by being engaged with a cylindrical supporting portion 46*b* of the developing cover member 504 fixed to the developing container 50. Thus, the first gear portion 47*a* of the stirring idler gear 47 provided in the developing container 50 engages with the second gear portion 45*b* of the developing driving member 45, and the second gear portion 47*b* engages with the gear portion 48*b* of the stirring gear 48. That is, the driving force received by the developing driving member 45 is transmitted to the stirring gear 48 through the stirring idler gear 47, so that the stirring member 54 can be rotated.

(Rotational Movement of Developing Unit)

A rotational movement constitution of the developing unit 5 will be described using parts (a) and (b) of FIG. 13. Parts (a) and (b) of FIG. 13 are exploded perspective views of the developing unit 2, in which part (a) shows a mounting state of the driving-side cover member 302, and part (b) shows a mounting state of the non-driving-side cover member 303. Here, a rotation center of the developing driving member 45 rotatably supported by the developing unit 5 as described above is referred to as a developing part N as shown in FIG. 13.

As shown in part (a) of FIG. 13, the developing cover member 504 fixed to the developing unit 5 includes an annular supporting portion 504*c*. The annular supporting portion 504*c* is provided coaxially with the hole 504*a* for supporting the developing driving member 45, so that a center of the annular supporting portion 504*c* coincides with the developing rotational axis N. Further, as shown in part (b) of FIG. 13, the non-driving-side bearing 503 fixed to the developing container 50 is provided with a cylindrical supporting portion 503*d* which coincides with the developing rotational axis N at a center thereof.

As shown in part (a) of FIG. 13, the annular supporting portion 504*c* is engaged with a developing supporting portion 302*d* provided on the driving-side cover member 302. Further, as shown in part (b) of FIG. 13, the supporting portion 503*d* is engaged with a developing supporting portion 303*b*, having an elongated-hole shape, of the non-driving-side cover member 303. By this, the developing unit 5 rotatably supported by the driving-side cover member 302 and the non-driving-side cover member 303 becomes rotatable about the developing rotational axis N as a rotation center relative to the drum unit 3. At this time, a rotation center of the developing driving member 45 and a rotation center of the developing unit 5 coincide with the developing rotational axis N. Further, the rotation center of the developing driving member 45 and a rotation center of the input member 41 also coincide with the developing rotational axis N, so that the coupling portion 41*c* of the input member 41 engages with the developing driving member 45, and thus the driving force can be transmitted from the input member 41 to the developing driving member 45.

(Drive Transmitting Path)

A driving force transmitting path to the respective rotatable members of the process unit 2 will be described using parts (a) and (b) of FIG. 14. Parts (a) and (b) of FIG. 14 are side views of the process unit 2 as viewed in a direction of the rotational axis of the photosensitive drum 31 from a side where the drum driving member 32 is provided. Part (a) of FIG. 14 shows a state in which the developing unit 5 is in the contact position where the developing roller 51 and the photosensitive drum 31 are in contact with each other. Part (b) of FIG. 14 shows a state in which the developing roller 51 and the photosensitive drum 31 are in separation from each other. Incidentally, in FIG. 14, for making easy to see the gear train, the driving-side cover member 302, the non-driving-side cover member 303, the driving-side bearing 502, and the non-driving-side bearing 504 are omitted.

The developing unit 5 is constituted to be rotatable about the developing rotational axis N relative to the drum unit 3. As shown in part (a) of FIG. 14, in the case where the developing unit 5 is positioned in the contact position, the developing roller 51 contacts the photosensitive drum 31, and is capable of developing the latent image on the surface of the photosensitive drum 31. In the case where the developing unit 5 is positioned in the contact position, below the mounting portion 501, a spacing cam 51 provided in the apparatus main assembly 10 is disposed. There is a gap H between the spacing cam 51 and a bottom 123*f* of the mounting portion 501. In a state in which the developing unit 5 is positioned in the contact position, when the driving force is inputted to the coupling portion 32*a* of the drum driving member 32 in an arrow Q direction shown in part (a) of FIG. 14, the photosensitive drum 31 is rotated in the arrow Q direction shown in part (a) of FIG. 14. further, the charging roller 35 in which the charging roller gear 40 engaging with the gear portion 32*b* of the drum driving member 32 is rotated in an arrow R direction shown in part (a) of FIG. 14. Further, the idler gear 43 engaging with the gear portion 32*b* of the drum driving member 32 is rotated, so that the input member 41 engaging with the idler gear 43 is rotated about the developing rotational axis N in an arrow K1 direction shown in part (a) of FIG. 14. The coupling portion 41*c* of the input member 41 engages with the coupling portion 45*d* of the developing driving member 45 and transmits the driving force, and therefore, is rotated in the arrow K1 direction shown in part (a) of FIG. 14. Here, the driving force transmitted to the developing driving member 45 by the input member 41 becomes an external force exerted on the developing unit 5, so that the developing unit 5 is rotated about the developing rotational axis N in the arrow K1 direction in part (a) of FIG. 14. Then, the developing roller 51 included in the developing unit 5 can be contacted to the photosensitive drum 31. Thus, in this constitution, the developing roller 51 is contacted to the photosensitive drum 31 by inputting the rotational force to the developing driving member 45 included in the developing unit 5, but the constitution is not limited thereto.

FIG. 15 is a side view of the process unit 2, provided inside the image forming apparatus 1, as viewed from an installation side of the non-driving-side cover member 303 in the rotational axis direction of the photosensitive drum 31. As shown in FIG. 15, the non-driving-side cover member 303 includes a protrusion-like spring hooking portion 303*c*, and the non-driving-side bearing 503 includes a protrusion-like spring hooking portion 503*e*. The developing pressing spring 305 is hooked on the spring hooking portion 303*c* and the spring hooking portion 503*e*, so that a force in an arrow G direction shown in FIG. 15 is applied to the developing unit 5. The developing unit 5 receiving the force in the arrow G direction shown in FIG. 15 is rotated about the developing rotational axis N in the arrow K1 direction shown in FIG. 15, and therefore, the developing roller 51 can be contacted to the photosensitive drum 31. Thus, in addition to transmission of the rotational force to the developing driving member 45, a contact pressure at which the developing roller 51 is contacted to the photosensitive drum 31 may be generated by using the spring.

As shown in part (a) of FIG. 14, the first gear portion 45*a* of the developing driving member 45 to which the driving force is inputted engages with the developing roller gear 39, and thus rotates the developing roller 51 in an arrow S direction shown in part (a) of FIG. 14. Further, the second gear portion 45*b* (not shown in this figure) engages with the supplying roller gear 44, and thus rotates the supplying roller 52 (not shown in this figure) in an arrow T direction shown in part (a) of FIG. 14. Further, the second gear portion 45*b* (not shown in this figure) engages with the stirring idler gear 47, and the stirring idler gear 47 engages with the stirring gear 48, and thus rotates the stirring gear 48 and the stirring member 54 (not shown in this figure) in an arrow U direction shown in part (a) of FIG. 14. Thus, the developing driving member 45 transmits the driving force to the developing roller 51, the supplying roller 52, and the stirring member 54 as rotatable members included in the developing unit 5. That is, on the developing driving member 45, a rotational load of these rotatable members included in the developing unit 5 is exerted, so that also, on the input member 41 for rotating the developing driving member 45, the rotational load of these rotatable members included in the developing unit 5 is exerted. Further, the rotational load of these rotatable members included in the developing unit 5 is also exerted on the drum driving member 32 for rotating the input member 41 through the idler gear 43.

That is, on the drum driving member 32, the rotational load generated from these rotatable members included in the developing unit 5 can be exerted. By this, rotation of the drum driving member 32 can be stabilized, so that rotation of the photosensitive drum 31 can be further stabilized.

When the discharge tray 14 shown in FIGS. 1 to 3 is moved from the closed position to the open position, in interrelation with the movement of the discharge tray 14, the spacing cam 51 is rotated in an arrow J direction shown in part (a) of FIG. 14, so that the spacing cam 51 contacts the bottom surface 123*f* of the mounting portion 501 as shown in part (b) of FIG. 14. The bottom surface 123*f* is pressed in an arrow F direction shown in part (b) of FIG. 14, so that the developing unit 5 is rotated about the developing rotational axis N in an arrow K direction shown in part (b) of FIG. 14, and reaches the separated position. At this time, a gap V shown in part 8*b*) of FIG. 14 is generated between the developing roller 51 and the photosensitive drum 31, so that the developing roller 51 is supplied from the photosensitive drum 31. Thus, even in the case where the developing unit 5 is positioned in the separated position, an engaging relationship between the gear portions of the drum unit 3 and the developing unit 5 is not changed. That is, the driving force in an arrow Q direction shown in part (b) of FIG. 14, inputted to the drum driving member 32 is transmitted from the input member 41 to the developing driving member 45 and then is transmitted to the rotatable members installed in the developing unit 5, similarly as when the developing unit 5 is positioned in the contact position. Even when the developing unit 5 is in the separated position, the load of the rotatable members included in the developing unit 5 is exerted on the drum driving member 32, so that the photosensitive drum 31 is stably rotated. Further, in the state in which the developing roller 51 is spaced from the photosensitive drum 31, the driving force can be transmitted to the rotatable members included in the developing unit 5, and therefore, the developing roller 51 is not readily deteriorated by friction thereof with the photosensitive drum 31. Further, in the state in which the developing unit 5 is in the separated position, the toner supplied to the toner accommodating chamber 36 of the developing container 50 through the mounting portion 501 is stirred by the stirring member 54, and then the toner can be supplied to the supplying roller 52 and the developing roller 51. On the other hand, when the discharge tray 14 shown in FIGS. 1 to 3 is moved from the open position to the closed position, in interrelation with the discharge tray 14, the spacing cam 51 is rotated in a direction opposite to the arrow J direction in part (a) of FIG. 14, so that the spacing cam 51 is separated from the bottom surface 123*f* as shown in part (a) of FIG. 14. The developing unit 5 is rotated about the developing rotational axis N in the arrow K1 direction shown in part (a) of FIG. 14, and then the developing unit 5 reaches the developing unit 5.

The mounting portion 501 is fixed to the developing unit 5, and therefore, the mounting portion 501 is also moved by rotation of the developing unit 5 about the developing rotational axis N. In the case where a user supplies the toner to the developing container 50 by using the toner pack 100, as described above, the discharged tray 14 is moved to the open position, so that the developing unit 5 is swung in an arrow K2 direction and then reaches the separated position shown in part (b) of FIG. 14. The user mounts the toner pack 100 to the mounting portion 501 of the developing unit 5 positioned in the separated position, and then supplies the toner in the toner pack 100. Details of the mounting portion 501 will be separately described later. When the supply of the toner by the toner pack 100 is completed, the user closes the discharge tray 14, so that the developing unit 5 is moved again to the contact position shown in part (a) of FIG. 16, and thus the image forming apparatus 1 is in a state in which image forming preparation can be started.

(Mounting Portion)

The mounting portion 501 will be described using FIGS. 16 to 18. Part (a) of FIG. 16 is a perspective view of the mounting portion 501 when a main body shutter 121 is in an open position. Part (b) of FIG. 16 is a perspective view of the mounting portion 501 when the main body shutter 121 is in a closed position. Part (c) of FIG. 16 is a perspective view of the mounting portion 501 as viewed from below the mounting portion 501. Parts (a) and (b) of FIG. 17 are perspective views of the main body shutter 121. Part (a) of FIG. 18 is a schematic view of the mounting portion 501 as viewed from above the mounting portion 501 along a rotational axis RA1. Parts (b) and (c) of FIG. 18 are an A1-A1 cross section and a B1-B2 cross section, respectively, of part (a) of FIG. 18.

The mounting portion 501 includes a base frame 123 and the main body shutter 121 which is provided inside the base frame 123 and which is rotatable relative to the base frame 123.

The main body shutter 121 is a cylindrical member of which upper portion is open as shown in parts (a) and (b) of FIG. 17. On a side wall extending in a direction of the rotational axis RA1 of the main body shutter 121, an inner peripheral surface 121*c* (first portion-to-be-engaged, first inner peripheral surface) about the rotational axis RA1, a shutter opening 121*a*, and a main body shutter engaging portion 121*b*. The inner peripheral surface 121*c* extends in a circumferential direction about the rotational axis RA1 and the direction of the rotational axis RA1. The main body shutter engaging portion 121*b* is provided in a position opposing the shutter opening 121*a* with respect to a direction perpendicular to the rotational axis RA1 as viewed in the direction of the rotational axis RA1, and protrude in a direction approaching the rotational axis RA1 relative to the inner peripheral surface 121*c*. On a bottom surface of the main body shutter 121, a main body shutter shaft 121*d* extending upward along the direction of the rotational axis RA1 is provided.

The base frame 123 is provided with a communication opening 123*a* communicating with an inside portion (toner accommodating chamber 36) of the developing container 50 as shown in part (c) of FIG. 16. Further, the base frame 123 is provided with a nozzle positioning portion 123*c* protruding toward the rotational axis RA1 in the direction perpendicular to the rotational axis RA1. Further, the base frame 123 has the bottom surface 123*f* for receiving a pressing force by the spacing cam 51 of the apparatus main assembly 10. The base frame 123 is integrated with the developing container 50 by being connected at a connecting surface 122 shown in part 8*c*) of FIG. 16 with the developing container cap portion 510 of the developing container 50.

The main body shutter 121 is constituted so as to be rotated about the rotational axis RA1 between an open position (part (a) of FIG. 16) where the shutter opening 121*a* communicates with the communication opening 123*a* of the base frame 123 and a closed position (part (b) of FIG. 16) where the shutter opening 121*a* does not communicate with the communication opening 123*a*.

(Toner Pack)

The toner pack 100 will be described. The toner pack 100 is constituted so that the toner pack 100 is mountable to the above-described mounting portion 501. Part (a) of FIG. 19 is a front view of the toner pack 100 when a pack-side shutter 1103 is in a shielding position. Part (b) of FIG. 19 is a front view of the toner pack 100 when the pack-side shutter 1103 is in an open position. Parts (c) and (d) of FIG. 19 are enlarged perspective views of the toner pack 100 in the neighborhood of a nozzle 1102 when the pack-side shutter 1103 is in the shielding position.

The toner pack 100 includes a pouch 1101 constituted so as to accommodate contents such as the toner, the nozzle 1102, and the pack-side shutter 1103 (container shutter) rotatable about a rotational axis RA2 relative to the nozzle 1102.

The pouch 1101 has flexibility and is provided on one end portion side of the toner pack 100 with respect to the rotational axis RA2 of the pack-side shutter 1103. The nozzle 1102 and the pack-side shutter 1103 are provided on the other end portion side of the toner pack 100 with respect to the rotational axis RA2. The rotational axis RA2 of the pack-side shutter 1103 coincides with the rotational axis RA1 of the main body shutter 121 in a state in which the toner pack 100 is mounted to the mounting portion 501. The pouch 1101 in this embodiment is formed with a flexible polypropylene sheet. Incidentally, as the pouch 1101, a bottle made of a resin material or a container made of paper, vinyl resin, or the like.

The nozzle 1102 has a side surface 1102*c* extending along the rotational axis RA2 as shown in part (b) of FIG. 19. The side surface 1102*c* is provided with a discharge opening 1102*a* constituted so as to communicate with the toner accommodating chamber 36 of the pouch 1101, and is provided with a nozzle portion-to-be-positioned 1102*d* (part (a) of FIG. 19). The toner accommodated in the pouch 1101 is constituted so as to be discharged to an outside of the toner pack 100 through the discharge opening 1102*a* by being crushed (deformed) by an external force applied to the pouch 1101 by the user. The nozzle 1102 further includes a protrusion 1102*e* protruding from a bottom surface, positioned on a side opposite from the pouch 1101, in a direction of the rotational axis RA2. The protrusion 1102*e* is provided with an inner peripheral surface 1102*e*1 about the rotational axis RA2. A function of the inner peripheral surface 1102*e*1 will be described later.

The pack-side shutter 1103 is provided so as to be rotatable about the rotational axis RA2 and is provided with an opening 1103*a*. The pack-side shutter 1103 is provided outside the side surface 1102*c* with respect to a radial direction r of an imaginary (virtual) circle VC about the rotational axis RA2. An arcuate surface of the side surface 1102*c* is a curved surface protruding toward an outside in the radial direction r. An inside surface of the pack-side shutter 1103, i.e., a surface opposing the side surface 1102*c* is a curved surface along the side surface 1102*c* of the nozzle 1102, and to which a substantially rectangular pack-side seal 1105 is attached. An outside surface 1103*c* of the pack-side shutter 1103 has a first protrusion surface 1103*g*, a second protrusion surface 1103*h*, and a third protrusion surface 1103*i* which protrude toward the outside of the outside surface 1103*c* in the radial direction of the rotational axis RA2. The first protrusion surface 1103*g*, the second protrusion surface 1103*h*, and the third protrusion surface 1103*i* are provided in positions different from each other with respect to a circumferential direction about the rotational axis RA2. In the state in which the toner pack 100 is mounted to the mounting portion 501, the first protrusion surface 1103*g*, the second protrusion surface 1103*h*, and the third protrusion surface 1103*i* contact the inner peripheral surface 121*c* of the main body shutter 121. By this, a position of the pack-side shutter 1103 relative to the main body shutter 121 with respect to the radial direction about the rotational axis RA2 is determined.

The pack-side shutter 1103 is constituted so as to be rotatable about the rotational axis RA2 between the shielding position (position shown in part (a) of FIG. 19) where the pack-side shutter 1103 shields the discharge opening 1102*a* of the nozzle 1102 and an open position (position shown in part (b) of FIG. 19) where the discharge opening 1102*a* is open. As shown in part (b) of FIG. 19, when the pack-side shutter 1103 is in the open position, the discharge opening 1102*a* of the nozzle 1102 is exposed through the opening 1103*a* of the pack-side shutter 1103.

As shown in part (a) of FIG. 19, when the pack-side shutter 1103 positioned in the shielding position is rotated about the rotational axis RA2 in an arrow K direction, the pack-side shutter 1103 reaches the open position shown in part (b) of FIG. 19. Reversely, when the pack-side shutter 1103 positioned in the open position is rotated in an arrow L direction, the pack-side shutter 1103 reaches the shielding position. That is, the arrow K direction as a first direction is a direction in which the pack-side shutter 1103 moves about the rotational axis RA2 from the shielding position toward the open position, and the arrow L direction as a second direction is a direction in which the pack-side shutter 1103 moves about the rotational axis RA2 from the open position toward the shielding position. In an operation of the pack-side shutter 1103, the pack-side shutter 1103 slides on the side surface 1102*c* of the nozzle 1102 through the pack-side seal 1105.

The nozzle 1102 includes, as shown in part (c) of FIG. 19, a portion-to-be-positioned 1102*d* including surfaces opposing each other with respect to a circumferential direction (direction perpendicular to the rotational axis RA2) about the rotational axis RA2. The nozzle portion-to-be-positioned 1102*d* includes a first opposing surface 1102*d*1 and a second opposing surface 1102*d*2 which extend in the direction perpendicular to the rotational axis RA2. The nozzle portion-to-be-positioned 1102*d* engages with the nozzle positioning portion 123*c* (parts (a) and (b) of FIG. 16, part (a) of FIG. 18) of the base frame 123 in the state in which the toner pack 100 is mounted to the mounting portion 501. By this, a position of the nozzle 1102 relative to the base frame 123 with respect to the rotational direction (circumferential direction) about the rotational axis RA1 (rotational axis 2) is determined. In other words, rotation of the nozzle 1102 about the rotational axis RA1 is restricted by contact of the first opposing surface 1102*d*1 or the second opposing surface 1102*d*2 with the nozzle positioning portion 123*c*.

The side surface 1103*c* of the pack-side shutter 1103 is provided with an opening 1103*a*.

As shown in part (c) of FIG. 19, when the pack-side shutter 1103 is in the shielding position, the nozzle portion-to-be-positioned 1102*d* is exposed through the opening 1103*a*. This is because when the toner pack 100 is mounted to the mounting portion 501 in a state in which the pack-side shutter 1103 is positioned in the shielding position, the nozzle portion-to-be-positioned 1102*d* is engaged with the nozzle positioning portion 123*c*. Further, the pack-side shutter 1103 is provided with a drive receiving portion (portion to which drive is transmitted) 1103*e* shown in part (d) of FIG. 19. The drive receiving portion 1103*e* provided on a side opposite from the nozzle portion-to-be-positioned 1102*d* with respect to the rotational axis RA2 in the case where the pack-side shutter 1103 is positioned in the shielding position. The drive receiving portion 1103*e* has a surface 1103*e*1, a surface 1103*e*2, and a side surface 1103*e*3 and is constituted so as to engage with the drive transmission portion 103*d* of an operating lever 103 described later. The side surface 1103*e*3 is provided between the surfaces 1103*e*1 and 1103*e*2 and is recessed toward an inside of the side surface 1103*c*. Further, at an upstream end portion of the pack-side shutter 1103 with respect to a mounting direction M of the pack-side shutter 1103, a flange portion 1103*f* extending toward an outside from the side surface 1103*c* in the radial direction r.

(Operating Lever)

The operating lever 103 (operating member) will be described. Part (a) of FIG. 20 is perspective view showing a state in which the operating lever 103 is disposed on a main body cover 700 covering the process unit 2. Part (b) of FIG. 20 is a schematic view showing a neighborhood of the operating lever 103 positioned in a closed position as viewed from above. Part (c) of FIG. 20 is a schematic view showing a neighborhood of the operating lever 103 positioned in an open position as viewed from above. Parts (a) and (b) of FIG. 21 are perspective views during mounting of the toner pack 100 to the mounting portion 501. Part (c) of FIG. 21 is a perspective view showing a state in which the mounting of the toner pack 100 to the mounting portion 501 is completed and the operating lever 103 is in the closed position. Part (d) of FIG. 21 is a perspective view showing a state in which the mounting of the toner pack 100 to the mounting portion 501 is completed and the operating lever 103 is in the open position.

The operating lever 103 is provided so as to be rotatable about the rotational axis RA1 of the main body shutter 121 relative to the main body cover 700 as shown in part (a) of FIG. 20. The operating lever 103 includes the inner peripheral surface 103*a* (main body portion-to-be-engaged, second portion-to-be-engaged, second inner peripheral surface) defining a center hole (main body opening), an upper surface 103*b*, and the drive transmission portion 103*d* protruding from the inner peripheral surface 103*a* toward the rotational axis RA1. The center hole of the operating lever 103 is a hole through which the mounting portion 501 is exposed to an outside of the apparatus main assembly 10. The operating lever 103 further includes an annular rib 103*c* protruding upward from the upper surface 103*b*, and a gripping portion 103*e* extending in a direction perpendicular to the rotational axis RA1. The inner peripheral surface 103*a* is a surface about the rotational axis RA1. The annular rib 103*c* includes a straight portion 103*c*1 extending linearly as viewed in the direction of the rotational axis RA1 and an arcuate portion 103*c*2 extending arcuately. The gripping portion 103*e* is a portion gripped by the user when the user rotates the operating lever 103.

As shown in parts (a) and (b) of FIG. 21, the user mounts the toner pack 100 in a state in which the pack-side shutter 103 is in the shielding position in the mounting direction M to the mounting portion 501 in a state in which the main body shutter 121 is in the shielding position and to the operating lever 103 in the closed position. At this time, the user aligns a position of the nozzle portion-to-be-positioned 1102*d* of the nozzle 1102 with a position of the nozzle positioning portion 123*c* of the base frame 123. At the same time, the user aligns a position of the drive receiving portion 1103*e* of the pack-side shutter 1103 with a position of the drive transmission portion 103*d* (main body shutter engaging portion 121*b*).

After the positional alignment of the toner pack 100 with the mounting portion 501, the user mounts the toner pack 100 to the mounting portion 501 in the mounting direction M. The inner peripheral surface 1102*e*1 of the protrusion portion 1102*e* of the nozzle 1102 shown in parts (c) and (d) of FIG. 19 and the main body shutter shaft 121*d* (FIG. 17) of the main body shutter 121 engage with each other. By this, a position of the nozzle 1102 relative to the main body shutter 121 (mounting portion 501) with respect to a radial direction about the rotational axis RA1 is determined. At this time, the drive transmission portion 1103*e* of the pack-side shutter 1103 engages with the drive transmission portion 103*d* of the operating lever 103 and the main body shutter engaging portion 121*b* of the main body shutter 121.

At the same time, the nozzle portion-to-be-positioned 1102*d* of the nozzle 1102 engages with the nozzle positioning portion 123*c* of the base frame 123. By this, the rotational axis RA2 of the pack-side shutter 1103 and the rotational axis RA1 of the main body shutter 121 become substantially coaxial with each other. The nozzle portion-to-be-positioned 1102*d* engages with the nozzle positioning portion 123*c* of the base frame 123, so that rotation of the nozzle 1102 relative to the base frame 123 is restricted. Accordingly, the operating lever 103, the pack-side shutter 1103, and the main body shutter 121 are substantially integrated with each other and are rotatable about the rotational axis RA1 (RA2) relative to the base frame 123 and the nozzle 1102.

When the operating lever 103 is rotated in a D direction from the closed position of part (c) of FIG. 21, the drive transmission portion 103*d* of the operating lever 103 presses the surface 1103*e*1 or the surface 1103*e*2 of the pack-side shutter 1103, so that the pack-side shutter 1103 is rotated. At the same time, the surface 1103*e*1 or the surface 1103*e*2 constituting the drive receiving portion 1103*e* presses the main body shutter engaging portion 121*b* of the main body shutter 121, so that the main body shutter 121 is rotated. As a result, the operating lever 103 reaches the open position as shown in part (d) of FIG. 21, so that it becomes possible to supply the toner from the pouch 1101 to the developing container 50 through the opening 1103*a* of the pack-side shutter 1103 and the opening 121*a* of the main body shutter 121. The user deforms the pouch 1101 by imparting a force from an outside, and thus supplies the toner in the pouch 1101 toward the developing container 50.

(Attachment)

A structure of an attachment 101 (ship lock member) will be described using FIGS. 22 and 23. Parts (a) to (d) of FIG. 22 are perspective views of the attachment 101. Parts (a) to (f) of FIG. 23 are a set of schematic views of the attachment 101 as viewed in six directions, in which part (a) is a left side view, part (b) is a top (plan) view, part (c) is a right side view, part (d) is a bottom view, part (e) is a rear view, and part (f) is a front view.

The attachment 101 is a member for being mounted to the mounting portion 501 during transportation of the image forming apparatus 1 in a state in which the toner pack 100 is not mounted to the mounting portion 501. The attachment 101 is moved in the mounting direction M shown in part (b) of FIG. 22 and is mounted to the mounting portion 501. The attachment 1 and the image forming apparatus 1 are combined with each other to prepare an image forming system.

The attachment 101 is a cylindrical-shaped member about a center axis C1 and is provided with a recessed portion 101*i* recessed in a direction of the center axis CA1. The recessed portion 101*i* is open on an upstream side thereof with respect to the mounting direction M, so that the user is capable of hooking his (her) fingers when the user grips the attachment 101. On an upstream end surface of the attachment 101 with respect to the mounting direction M, a plurality of ribs 101*j* each extending in a direction perpendicular to the center axis CA1 are provided. The ribs 101*j* function as an antislip member when the user grips the attachment 101.

The attachment 101 has an outer peripheral surface 101*h* about the center axis CA1, and the outer peripheral surface 101*h* is not provided with a hole communicating with an inside of the recessed portion 101*i*. The attachment 101 further includes four protrusions 101*a* (first protrusion) 101*b* (second protrusion), 101*c* (third protrusion), and 101*d* (fourth protrusion) which protrude from the outer peripheral surface 101*h* toward and outside in a radical direction about the center axis CA1. The four protrusions 101*a* to 101*d* are provided in positions different from each other with respect to a circumferential direction of the center axis CA1.

The attachment 101 further includes a first recessed portion 101*e* which is recessed from the outer peripheral surface 101*h* toward an inside in the radial direction about the center axis CA1 and which includes a surface 101*e*1 and a surface 101*e*2 which extend in a direction perpendicular to the center axis CA1. The first recessed portion 101*e* is provided between the first protrusion 101*a* and the second protrusion 101*b* with respect to the circumferential direction about the center axis CA1. The attachment 101 further includes a second recessed portion 101*g* which is recessed from the outer peripheral surface 101*h* toward an inside in the radial direction about the center axis CA1 and which includes a surface 101*g*1 and a surface 101*g*2 which extend in the radial direction arrow to the center axis CA1. The second recessed portion 101*g* is provided between the third protrusion 101*c* and the fourth protrusion 101*d* with respect to the circumferential direction about the center axis CA1. As shown in part (d) of FIG. 23, as viewed in the direction of the center axis CA1, the second recessed portion 101*g* is on a side opposite from the first recessed portion 101*e* with respect to the center axis CA1.

The attachment 101 includes a flange portion 101*m* which is provided on an upstream side with respect to the mounting direction M and which extends toward an outside in the radial direction about the center axis CA1. An outer edge portion of the flange portion 101*m* includes a straight portion 101*m*1 extending linearly and an arcuate portion 101*m*2 extending arcuately as viewed in the direction of the center axis CA1 as shown in part (b) of FIG. 23. Further, as shown in part (d) of FIG. 23, on a downstream end surface of the flange portion 101*m* with respect to the mounting direction M, a plurality of abutting ribs 101*k* (contact portions) protruding in the direction of the center axis CA1.

Next, a function of the attachment 101 will be described. Part (a) of FIG. 24 is a perspective view showing a neighborhood of the mounting portion 501 and the operating lever 103 in a state in which the attachment 101 is mounted to the mounting portion 501. Part (b) of FIG. 24 is a schematic view showing an attitude of the mounting portion 501 in the state in which the attachment 101 is mounted to the mounting portion 501. Part (a) of FIG. 25 is a schematic view of the mounting portion 501 to which the attachment 101 is mounted, as viewed from above. Part (b) of FIG. 25 is a C1-C1 cross-sectional view of part (a) of FIG. 25. Part (c) of FIG. 25 is a D1-D1 cross-sectional view of part (a) of FIG. 25. Part (a) of FIG. 26 is a perspective view of the image forming apparatus 1 in a state in which the discharge tray 14 is in the open position and in which the attachment 101 is not mounted to the mounting portion 501. Part (b) of FIG. 26 is a perspective view of the image forming apparatus 1 in a state in which the discharging tray 14 is in the open position and in which the attachment 101 is mounted to the mounting portion 501. Part (c) of FIG. 26 is a perspective view in a state in which the discharge tray 14 is in the closed position and in which the attachment 101 is mounted to the mounting portion 501.

A manner of determining a phase of the attachment 101 with respect to the circumferential direction about the rotational axis RA1 when the attachment 101 is mounted to the mounting portion 501 will be described. The attachment 101 is mounted to the mounting portion 501 in a phase such that the straight portion 101*m*1 of the flange portion 101*m* of the attachment 101 opposes the straight portion 103*c*1 of the annular rib 103*c* of the operating lever 103. By matching the phase of the attachment 101 with this phase, the first recessed portion 101*e* and the second recessed portion 101*g* are positioned in positions corresponding to the drive transmission portion 103*d* (main body shutter engaging portion 121*b*) of the operating lever 103 and the nozzle positioning portion 123*c* of the base frame 123, respectively. Therefore, the attachment 101 is mountable to the mounting portion 501. Rotation of the attachment 101 about the rotational axis RA1 is restricted by engagement of the second recessed portion 101*g* with the nozzle positioning portion 123*c* of the base frame 123.

When the attachment 101 is mounted to the mounting portion 501, as shown in part (b) of FIG. 25, the protrusions 101*a* to 101*d* (101*c* in this cross-sectional view) of the attachment 101 and the inner peripheral surface 121*c* of the main body shutter 121 are constituted so as to engage (contact) with each other. By this, a position of the attachment 101 relative to the main body shutter 121 with respect to the radial direction about the center axis CA1 (rotational axis RA1) is determined. The protrusions 101*a* to 101*d* (101*c* in this cross-sectional view) further engage with the inner peripheral surface 103*a* of the operating lever 103. By this, the attachment 101 engage with both the mounting portion 501 which is a part of the developing unit 5 and the operating lever 103 which is a part of the apparatus main assembly 10. In part (b) of FIG. 25, of the first engaging portion 101*c* of the attachment 101, a portion engaging (contacting) with the inner peripheral surface 121*c* of the main body shutter 121 is a first engaging portion **101*c*1, and a portion contacting the inner peripheral surface 103*a* of the operating lever 103 is a second engaging portion 101*c*2. The first engaging portion 101*c*1 and the second engaging portion 101*c*2 are surfaces positioned in different positions with respect to the direction of the rotational axis RA1. Further, the first engaging portion 101*c* and the second engaging portion 101*c*2 are surfaces in the same position where distances thereof from the center axis CA1 in the direction perpendicular to the center axis CA1 are equal to each other. Further, the second engaging portion 101*c*2 is, as shown in part (b) of FIG. 25, positioned between the first engaging portion 101*c*1 and the flange portion 101*m* with respect to the direction of the rotational axis RA1**.

The developing unit 5 including the mounting portion 501 has a constitution such that in the case where the attachment 101 is not mounted to the mounting portion 501, relative to the apparatus main assembly 10 (drum unit 3), the developing unit 5 is rotatable in an arrow K1 direction or an arrow K2 direction about a developing rotational axis N as shown in part (b) of FIG. 24.

Here, an arrow K' direction which is a tangential direction of a rotation locus (arc) of the mounting portion 501 represented by the arrows K1 and K2 cross the mounting direction M of the attachment 101. Accordingly, the attachment 101 engages with the main body shutter 121 and the operating lever 103 as described above, so that rotation of the developing unit 5 about the developing rotational axis N relative to the apparatus main assembly 10 (drum unit 3) is restricted. Further, as shown in part (c) of FIG. 26, in the state in which the attachment 101 is mounted to the mounting portion 501, the discharge tray 14 is movable to the closed position. At this time, even when the spacing cam 51 is moved to the separated position as shown in part (b) of FIG. 24 in interrelation with the operation of movement of the discharge tray 14 to the closed position, the developing unit 5 is maintained at the separated position from the drum unit 3. That is, during transportation of the image forming apparatus 1, by mounting the attachment 101 to the mounting portion 501, the developing roller 51 can be separated from the photosensitive drum 31. By this, an effect of suppressing deformation of the surface of the developing roller 51.

The abutting rib **101*k* provided at a lower surface of the flange portion 101*m* of the attachment 101 abuts against an upper surface (portion-to-be-abutted) of the operating lever 103 as shown in parts (b) and (c) of FIG. 25. By this, a position of the attachment 101 relative to the operating lever with respect to the mounting direction (center axis CA1**) is determined.

Incidentally, different from the toner pack 100, the attachment 101 does not include the toner accommodating portion for accommodating the toner.

As described above, by mounting the attachment 101 to the mounting portion 501, it is possible to suppress vibration of the developing unit 5 during transportation of the image forming apparatus 1.

Incidentally, in this embodiment, in the case where the attachment 101 is mounted to the mounting portion 501, a constitution in which the attachment 101 engages with the inner peripheral surface **103*a* of the operating lever 103 of the apparatus main assembly 10 was employed, but the present invention is not limited thereto. For example, a constitution in which the attachment 101 engages with an inner peripheral surface of a main body opening provided in the main body cover 700 shown in part (a) of FIG. 20** may also be employed.

In the process unit 2 in this embodiment, although the developing unit 5 is constituted so as to be rotatable about the developing rotational axis N relative to the drum unit 3, the present invention is not limited thereto. A similar effect is achieved by mounting an attachment to a mounting portion for a process unit in which a developing unit is fixed to a drum unit at a contact position.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-125412 filed on Aug. 5, 2022, which is hereby incorporated by reference herein in its entirety.

What is claimed is:

1. An attachment for use with an image forming apparatus which includes a main assembly including a photosensitive drum and a main assembly portion-to-be-engaged, and which includes a developing unit including a developing container, a developing roller carrying toner accommodated in the developing container, and a mounting portion to which a toner container accommodating the toner is mountable and which is constituted so as to communicate with an inside of the developing container and so as to be exposed to an outside of the main assembly, the developing unit being constituted so as to be movable relative to the main assembly, the attachment comprising:

a first engaging portion configured to engage with the mounting portion; and a second engaging portion configured to engage with the main assembly portion-to-be-engaged, wherein the attachment is mountable to the mounting portion in a state in which the toner container is not mounted to the mounting portion, and wherein the attachment does not include a toner accommodating portion for accommodating the toner.

2. The attachment according to claim 1, wherein the mounting portion includes a cylindrical shutter rotatable about a rotational axis between a communication position and a non-communication position and having an inner peripheral surface opposing the rotational axis, the communication position being a position where the shutter communicates the inside of the developing container and an outside of the image forming apparatus with each other through the mounting portion, and the non-communication position being a position where the shutter does not communicate the inside of the developing container and the outside of the image forming apparatus with each other through the mounting portion, and wherein in a state in which the attachment is mounted to the mounting portion, the attachment has an outer peripheral surface opposing the inner peripheral surface of the shutter and at least one protrusion protruding from the outer peripheral surface toward the rotational axis, and wherein the first engaging portion is provided on the at least one protrusion and is configured to contact the inner peripheral surface of the shutter.

3. The attachment according to claim 2, wherein the main assembly includes a main assembly opening which is for exposing the mounting portion to the outside of the main assembly in a case that the inner peripheral surface of the shutter is a first inner peripheral surface and which has a second inner peripheral surface opposing the rotational axis, and the main assembly portion-to-be-engaged is the second inner peripheral surface, and wherein the second engaging portion is provided on the at least one protrusion and is configured to contact the second inner peripheral surface.

4. The attachment according to claim 3, wherein the at least one protrusion is a plurality of protrusions provided on the outer peripheral surface in different positions with respect to a circumferential direction about the rotational axis.

5. The attachment according to claim 2, wherein the first engaging portion and the second engaging portion are provided in different positions with respect to a direction of the rotational axis.

6. The attachment according to claim 5, wherein the first engaging portion and the second engaging portion are surfaces each extending in the direction of the rotational axis and each being equidistant from the rotational axis with respect to a direction perpendicular to the rotational axis.

7. The attachment according to claim 2, further comprising a flange portion extending to an outside of the outer peripheral surface in a radial direction about the rotational axis, wherein the flange portion has a contact surface which is directed in a direction of the rotational axis and which is for determining a position relative to the mounting portion with respect to the direction of the rotational axis in contact with a portion-to-be-contacted of the main assembly.

8. The attachment according to claim 7, wherein with respect to the direction of the rotational axis, the second engaging portion is between the flange portion and the first engaging portion.

9. The attachment according to claim 1, wherein the developing unit is configured to be movable relative to the main assembly between a contact position where the developing roller contacts the photosensitive drum and a separated position where the developing roller is separated from the photosensitive drum, and wherein the attachment is configured to be mountable to the mounting portion when the developing unit is in the separated position, and wherein the attachment is configured to restrict movement of the developing unit from the separated position to the contact position in a state in which the attachment is mounted to the mounting portion.

10. An image forming system comprising:

(i) a toner container configured to accommodate toner;

(ii) an image forming apparatus including (ii-i) a main assembly including a photosensitive drum and a main assembly portion-to-be-engaged, and (ii-ii) a developing unit including a developing container, a developing roller carrying toner accommodated in the developing container, and a mounting portion to which the toner container accommodating the toner is mountable and which is configured to communicate with an inside of the developing container and to be exposed to an outside of the main assembly, the developing unit being configured to be movable relative to the main assembly, and (iii) an attachment configured to be detachably mountable to the mounting portion in a state in which the toner container is not mounted to the mounting portion, wherein the attachment does not include a toner accommodating portion for accommodating the toner, the attachment including (iii-i) a first engaging portion configured to engage with the mounting portion, and (iii-ii) a second engaging portion configured to engage with the main assembly portion-to-be-engaged.

11. The image forming system according to claim 10, wherein the mounting portion includes a cylindrical shutter rotatable about a rotational axis between a communication position and a non-communication position and having an inner peripheral surface opposing the rotational axis, the communication position being a position where the shutter communicates the inside of the developing container and an outside of the image forming apparatus with each other through the mounting portion, and the non-communication position being a position where the shutter does not communicate the inside of the developing container and the outside of the image forming apparatus with each other through the mounting portion, and wherein in a state in which the attachment is mounted to the mounting portion, the attachment has an outer peripheral surface opposing the inner peripheral surface of the shutter and at least one protrusion protruding from the outer peripheral surface toward the rotational axis, and wherein the first engaging portion is provided on the at least one protrusion and is configured to contact the inner peripheral surface of the shutter.

12. The image forming system according to claim 11, wherein the main assembly includes a main assembly opening which is for exposing the mounting portion to the outside of the main assembly in a case that the inner peripheral surface of the shutter is a first inner peripheral surface and which has a second inner peripheral surface opposing the rotational axis, and the main assembly portion-to-be-engaged is the second inner peripheral surface, and wherein the second engaging portion is provided on the at least one protrusion and is configured to contact the second inner peripheral surface.

13. The image forming system according to claim 12, wherein the at least one protrusion is a plurality of protrusions provided on the outer peripheral surface in different positions with respect to a circumferential direction about the rotational axis.

14. The forming system according to claim 13, wherein the first engaging portion and the second engaging portion are surfaces each extending in the direction of the rotational axis and each being equidistant from the rotational axis with respect to a direction perpendicular to the rotational axis.

15. The image forming system according to claim 11, wherein the first engaging portion and the second engaging portion are provided in different positions with respect to a direction of the rotational axis.

16. The image forming system according to claim 11, wherein the toner container includes a container shutter configured to rotate about the rotational axis so as to open and close a discharge opening for permitting discharge of the toner, and wherein the main assembly includes an operating member configured to engage with the container shutter in a state in which the toner container is mounted to the mounting portion and to rotate about the rotational axis together with the container shutter, the main assembly portion-to-be-engaged being a part of the operating member.

17. The image forming system according to claim 11, wherein the mounting portion has a surface-to-be-contacted directed upward, wherein the attachment includes a flange portion extending to an outside of the outer peripheral surface in a radial direction about the rotational axis, and wherein the flange portion has a contact surface directed downward, the contact surface contacting the surface-to-be-contacted of the mounting portion so that a position of the attachment relative to the mounting portion with respect to the direction of the rotational axis is determined.

18. The image forming system according to claim 17, wherein with respect to the direction of the rotational axis, the second engaging portion is between the flange portion and the first engaging portion.

19. The image forming system according to claim 10, wherein the developing unit is configured to be movable relative to the main assembly between a contact position where the developing roller contacts the photosensitive drum and a separated position where the developing roller is separated from the photosensitive drum, and wherein the attachment is configured to be mountable to the mounting portion when the developing unit is in the separated position, and wherein the attachment is configured to restrict movement of the developing unit from the separated position to the contact position in a state in which the attachment is mounted to the mounting portion.

20. The forming system according to claim 10, wherein the main assembly includes a cover movable between an open position where the mounting portion is exposed to an outside of the main assembly and a closed position where the cover covers the mounting portion so that the mounting portion is not exposed to the outside of the main assembly, and wherein the cover is movable from the open position to the closed position in a state in which the attachment is mounted to the mounting portion.

* * * * *